(12) United States Patent
Muramatsu et al.

(10) Patent No.: US 7,799,843 B2
(45) Date of Patent: Sep. 21, 2010

(54) FILM

(75) Inventors: Makoto Muramatsu, Haibara-gun (JP);
Akira Asano, Haibara-gun (JP);
Kensuke Morita, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/392,794

(22) Filed: Feb. 25, 2009

(65) Prior Publication Data

US 2009/0221778 A1   Sep. 3, 2009

(30) Foreign Application Priority Data

Feb. 29, 2008  (JP) ............... 2008-050086
Feb. 29, 2008  (JP) ............... 2008-050124

(51) Int. Cl.
*C08J 3/28* (2006.01)
*C08F 30/08* (2006.01)
*C08F 38/00* (2006.01)
*B32B 27/00* (2006.01)

(52) U.S. Cl. ............ 522/148; 522/99; 526/279; 526/285; 427/553; 427/904; 428/447

(58) Field of Classification Search ............ 427/508, 427/515, 553, 904; 526/285, 279; 522/99, 522/148; 428/447
See application file for complete search history.

(56) References Cited

U.S. PATENT DOCUMENTS

| 6,469,123 | B1 | 10/2002 | Lau et al. | |
|---|---|---|---|---|
| 6,790,792 | B2 | 9/2004 | Shaffer, II et al. | |
| 7,557,035 | B1 * | 7/2009 | Ryan et al. | 438/638 |
| 2007/0197678 | A1 * | 8/2007 | Cavaleiro et al. | 522/99 |
| 2008/0076850 | A1 * | 3/2008 | Asano | 522/172 |
| 2009/0104387 | A1 * | 4/2009 | Postupack et al. | 428/34.6 |

FOREIGN PATENT DOCUMENTS

| JP | 2000-334881 A | 12/2000 |
|---|---|---|
| JP | 2002-534546 A | 10/2002 |
| JP | 2004-504455 A | 2/2004 |

* cited by examiner

*Primary Examiner*—Fred M Teskin
(74) *Attorney, Agent, or Firm*—Sughrue Mion, PLLC

(57) ABSTRACT

A file is formed by coating a substrate with a film-forming composition including a compound having an alicyclic hydrocarbon structure and irradiating the coated composition with microwaves having a frequency of 5.8 GHz. An insulating film is formed by irradiating a film including a compound having a siloxane structure with microwave having a frequency of 5.8 GHz. These films possess excellent film properties such as dielectric constant and mechanical strength.

4 Claims, No Drawings

FILM

BACKGROUND OF THE INVENTION

The present invention relates to a film and a film-forming composition therefore. More specifically, the invention relates to an insulating film which is adapted for use in electronic devices such as semiconductor devices, has good film properties such as dielectric constant and mechanical strength, and can be formed as a coat of suitable and uniform thickness. The invention further relates to an electronic device made using such an insulating film.

Recently, in the field of electronic materials, advances in the levels of integration, functionality and performance have led to increases in circuit resistance and capacitance between interconnects, and to increases in power consumption and delay time. Of these, because an increase in the delay time lowers the signal speed of devices and leads to crosstalk, a lower parasitic resistance and a lower parasitic capacitance are desired in order to shorten the delay time and thus increase the speed of the device. One specific approach for lowering the parasitic capacitance currently being tried is to cover the periphery of the interconnects with an insulating film (also referred to herein as an "interlayer dielectric") having a low dielectric constant.

It is desired that such an interlayer dielectric have an excellent heat resistance capable of withstanding the thin-film forming operation during mount board production and subsequent operations such as chip connection and pin attachment, and that it have a chemical resistance capable of withstanding wet processes. Moreover, in recent years, increasing use is being made of low-resistance copper interconnects in place of aluminum interconnects; with this transition, planarization using a chemical mechanical polishing (CMP) process has become commonplace. A high mechanical strength capable of withstanding the CMP process is thus desired.

A number of resin compositions for forming interlayer dielectrics have already been described in the art. For example, JP 2002-534546 A discloses a highly heat-resistant insulating film made of a high heat-resistance resin in which the basic backbone structure is a polyarylene ether. In addition, JP 2004-504455 A discloses thermoset monomers such as diadamantane monomers substituted with aryl groups and carbon-carbon triple bonds. Moreover, resins constructed of such monomers are described as forming materials having a low dielectric constant. Yet, to achieve high-speed devices, it is desirable that the dielectric constant be lowered even further.

One method that is known for achieving a lower dielectric constant involves adding a pyrolyzable compound to a dielectric film so as to form pores and thereby lower the dielectric constant. Yet, although the greater porosity does result in a lower dielectric constant, such porous films have a number of drawbacks, including a lower mechanical strength and a susceptibility to increases in dielectric constant owing to moisture adsorption. Because materials which fully satisfy the desired qualities, including the low dielectric constant and good mechanical characteristics required of an insulating film, have not previously been found, there has been a need for further improvements.

Silica ($SiO_2$) films formed by vacuum processes such as chemical vapor deposition (CVD) have until now been frequently used as insulating films and films for optical applications. In addition, coating-type insulating films referred to as spin-on-glass (SOG) films which are composed primarily of a product of tetraalkoxysilane hydrolysis have recently come into use, primarily in order to achieve more uniform interlayer dielectrics. Also, the increasing level of semiconductor device integration has led to the development of what are known as organic SOG films—interlayer dielectrics having a low dielectric constant which are composed primarily of polyorganosiloxane.

However, films composed of inorganic materials generally do not have a very low dielectric constant. SiOF films recently investigated as low-dielectric CVD films have a relative dielectric constant of about 3.3 to 3.5. Yet, such films have a high moisture absorption, as a result of which the dielectric constant rises in the course of use.

In view of the above, methods are known for adding a high-boiling solvent or a pyrolyzable compound to an organopolysiloxane as an insulating film material having excellent insulating properties, heat resistance and durability, and thereby forming pores so as to lower the dielectric constant. However, in such porous films, although forming numerous pores does lower the dielectric constant, a number of problems arise, such as a decline in mechanical strength and a susceptibility to increases in the dielectric constant due to moisture absorption. Another problem is that, owing to the formation of mutually interconnected pores, the copper that has been used in the interconnects diffuses into the insulating film.

An attempt to obtain a film having a low refractive index and a low density by coating a solution prepared by adding a low-molecular-weight cage compound to an organic polymer is also known (see JP 2000-334881 A). However, the addition of a cage compound monomer fails to provide adequate refractive index and dielectric constant-lowering effects. Other drawbacks of this approach include a deterioration in the state of the coated surface and film loss during baking. Because materials which fully satisfy the desired qualities, including the low dielectric constant and good mechanical characteristics required of an insulating film, have not previously been found, there has been a need for further improvements.

SUMMARY OF THE INVENTION

It is therefore the object of a first aspect of the invention to provide a film for resolving the above problems, and more particularly a film which possesses excellent film properties such as dielectric constant and mechanical strength for use in electronic devices such as semiconductor devices.

It is the object of a second aspect of the invention to provide an insulating film for resolving the above problems, and more particularly an insulating film which is adapted for use as an interlayer dielectric in electronic devices such as semiconductor devices, has excellent film properties such as dielectric constant and Young's modulus, and can be formed as a coat of suitable and uniform thickness.

The inventors have found that the problems described above can be resolved by the following films, insulating films and electronic devices.

<1> A film which is formed by a process comprising the steps of:
coating a substrate with a film-forming composition comprised of a compound having an alicyclic hydrocarbon structure, and
irradiating the coated composition with microwaves having a frequency of 5.8 GHz.

<2> The film of <1>, wherein the compound having an alicyclic hydrocarbon structure is a compound having a cage structure.

<3> The film of <2>, wherein the compound having a cage structure is a compound having a diamantane structure.

<4> The film of <2>, wherein the compound having a cage structure is a compound having an adamantane structure.

<5> The film of <3>, wherein the compound having a diamantane structure is a polymer of a compound of general formula (A) below

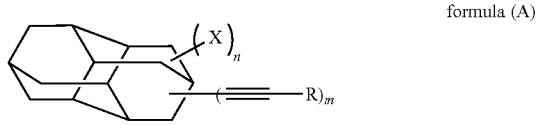

formula (A)

wherein each occurrence of R is independently a hydrogen atom, alkyl, alkenyl, alkynyl, aryl or silyl; each occurrence of X is independently a halogen atom, alkyl, alkenyl, aryl or silyl; the letter m is an integer from 1 to 14; and the letter n is an integer from 0 to 13.

<6> An insulating film which is formed by a process comprising the step of irradiating a film comprised of a compound having a siloxane structure with microwaves having a frequency of 5.8 GHz.

<7> The insulating film of <6>, wherein the film comprised of a compound having a siloxane structure is a coat of a film-forming composition comprised of a compound having a siloxane structure.

<8> The insulating film of <7>, wherein the compound having a siloxane structure is a silsesquioxane compound.

<9> The insulating film of <8>, wherein the silsesquioxane compound is a cage-type silsesquioxane compound.

<10> The insulating film of <9>, wherein the cage-type silsesquioxane compound is a polymer of a cage-type silsesquioxane compound of general formula (1) below $(R_1SiO_{3/2})_n$ (1), wherein each occurrence of $R_1$ is independently a non-hydrolyzable group, with the proviso that at least two occurrences of $R_1$ are groups containing vinyl or ethynyl; and the letter n is an integer from 8 to 16.

<11> An electronic device comprising the film of <1> or the insulating film of <6>.

According to the first aspect of the invention, there can be obtained a film which has excellent film properties such as dielectric constant and mechanical strength and which is well-suited for use as an interlayer dielectric in electronic devices such as semiconductor devices.

According to the second aspect of the invention, there can be formed a film which is endowed with an outstanding uniformity of film quality, has a low dielectric constant and other excellent film properties such as Young's modulus, and is well-suited for use as an interlayer dielectric in electronic devices such as semiconductor devices.

DETAILED DESCRIPTION OF THE INVENTION

The film according to the first aspect of the present invention, the insulating film according to the second aspect of the invention, and methods for producing such films are described in detail below.

To begin with, the first aspect of the invention is described.

First Aspect

The film according to the first aspect of the invention is formed by a process which involves coating a substrate with a film-forming composition containing a compound having an alicyclic hydrocarbon structure, then irradiating the coated composition with microwaves having a frequency of 5.8 GHz.

Compound Having Alicyclic Hydrocarbon Structure

The film-forming composition of the first aspect of the invention includes a compound having an alicyclic hydrocarbon structure. Compounds with an alicyclic hydrocarbon structure have a low moisture adsorption and a relatively good heat resistance. The alicyclic hydrocarbon structure may be monocyclic or polycyclic, and the aliphatic ring may include a heteroatom. Illustrative examples include compounds of five or more carbons having a monocyclo, bicyclo, tricyclo or tetracyclo structure. The number of carbons is preferably from 6 to 30, and more preferably from 7 to 25. These alicyclic hydrocarbon structures may have a substituent. Illustrative examples of the alicyclic portion of the alicyclic hydrocarbon structure are shown below.

(1)

(2)

(3)

(4)

(5)

(6)

(7)

(8)

(9)

(10)

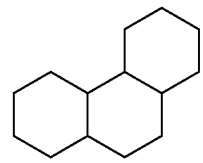

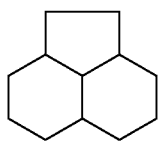 (11)
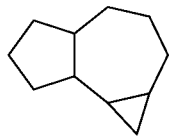 (12)
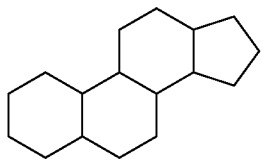 (13)
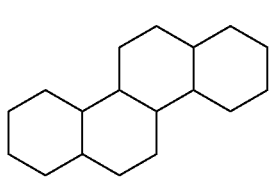 (14)
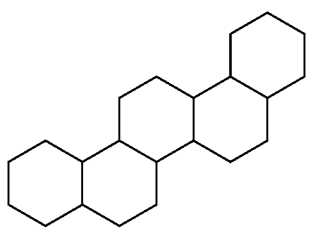 (15)
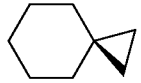 (16)
 (17)
 (18)
 (19)
 (20)
 (21)
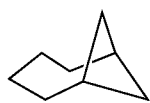 (22)
 (23)
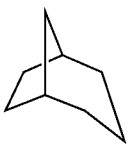 (24)
 (25)
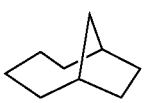 (26)
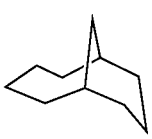 (27)
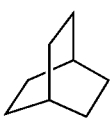 (28)
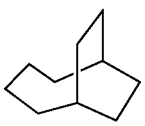 (29)
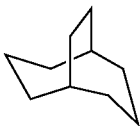 (30)
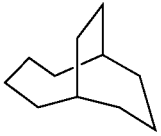 (31)
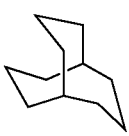 (32)
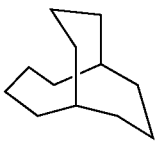 (33)
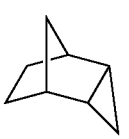 (34)

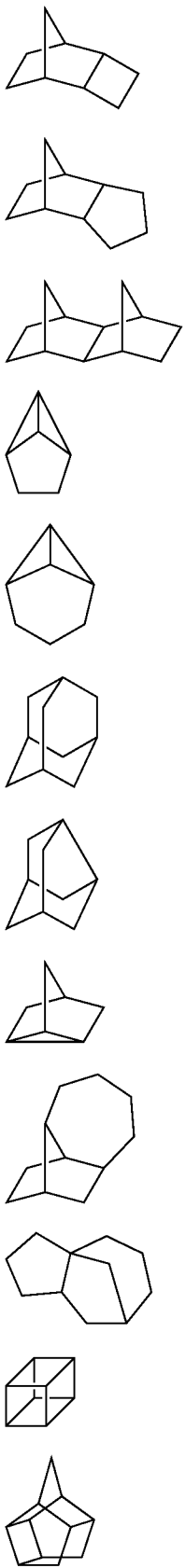

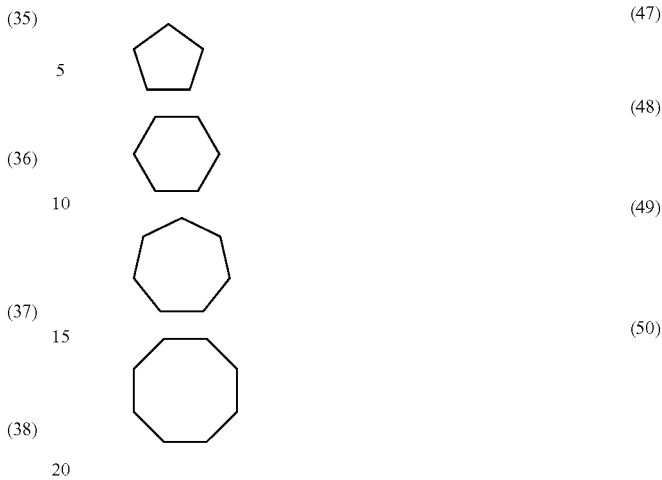

The alicyclic hydrocarbon structure may include as substituents, for example, oxy groups, alkyl groups, halogen atoms, hydroxyl groups, alkoxy groups, carboxyl groups and alkoxycarbonyl groups. Alkyl groups refers herein to substituents which are preferably selected from among lower alkyls such as methyl, ethyl, propyl, isopropyl and butyl, and more preferably selected from among methyl, ethyl, propyl and isopropyl. Preferred examples of alkoxy groups include those having from 1 to 4 carbons, such as methoxy, ethoxy, propoxy and butoxy. The alkyl, alkoxy and alkoxycarbonyl groups may also have substituents, illustrative examples of such substituents being $C_{1-4}$ alkoxy groups (e.g., methoxy, ethoxy, butoxy), hydroxyl groups, oxo groups, alkylcarbonyl groups (preferably having from 2 to 5 carbons), alkylcarbonyloxy groups (preferably having from 2 to 5 carbons), alkyloxycarbonyl groups (preferably having from 2 to 5 carbons) and halogen atoms (e.g., chlorine, bromine, fluorine).

Compound Having Cage Structure

The compound having an alicyclic hydrocarbon structure is preferably a compound having a cage structure. As used in the first aspect of the invention, "cage structure" refers to a molecule which has a cavity that is defined by a plurality of rings formed of covalently bonded atoms and in which any point positioned within the cavity cannot leave the cavity without passing through the rings. For example, an adamantane structure may be regarded as a cage structure. By way of contrast, in cyclic structures having a single bridge, such as norbornane (bicyclo[2.2.1]heptane), because the ring of the single-bridged cyclic compound does not define a cavity, such compounds are not regarded as cage compounds.

The total number of carbons in the cage structure is preferably from 10 to 30, more preferably from 11 to 18, and most preferably 14. These carbon atoms do not include carbon atoms in linkage groups or substituents substituted on the cage structure. For example, 1-methyladamantane is composed of 10 carbon atoms, and 1-ethyldiamantane is composed of 14 carbon atoms.

The cage structure is preferably a saturated hydrocarbon structure. Examples that are preferable from the standpoint of having a high heat resistance include adamantane, diamantane, triamantane, tetramantane and dodecahedrane having diamondoid structures. Adamantane, diamantane and triamantane are more preferred. Diamantane is most preferred because a low dielectric constant can be achieved and synthesis is easy.

The cage structure in the first aspect of the present invention may have one or more substituent thereon. Exemplary substituents include halogen atoms (fluorine, chlorine, bromine or iodine), linear, branched and cyclic alkyl groups of 1 to 10 carbons (e.g., methyl, t-butyl, cyclopentyl, cyclohexyl), alkenyl groups of 2 to 10 carbons (e.g., vinyl, propenyl), alkynyl groups of 2 to 10 carbons (e.g., ethynyl, phenylethynyl), aryl groups of 6 to 20 carbons (e.g., phenyl, 1-naphthyl, 2-naphthyl), acyl groups of 2 to 10 carbons (e.g., benzoyl), alkoxycarbonyl groups of 2 to 10 carbons (e.g., methoxycarbonyl), carbamoyl groups of 1 to 10 carbons (e.g., N,N-diethylcarbamoyl), aryloxy groups of 6 to 20 carbons (e.g., phenoxy), arylsulfonyl groups of 6 to 20 carbons (e.g., phenylsulfonyl), nitro groups, cyano groups and silyl groups (e.g., triethoxysilyl, methyldiethoxysilyl, trivinylsilyl). Of these, preferred substituents include fluorine atoms, bromine atoms, linear, branched or cyclic alkyl groups of 1 to 5 carbons, alkenyl groups of 2 to 5 carbons, alkynyl groups of 2 to 5 carbons and silyl groups. These substituents may in turn be substituted with other substituents.

The cage structure in the first aspect of the invention has a valence of preferably from 1 to 4, more preferably 2 or 3, and most preferably 2. Groups which bond to the cage structure may be substituents having a valence of 1 or more, or may be linkage groups having a valence of 2 or more. As used herein, "valence" refers to the number of electrons available for bonding.

The "compound having a cage structure" used in the first aspect of the invention may be a low-molecular-weight compound or a high-molecular-weight compound (e.g., a polymer), although it is preferably a polymer. If the compound having a cage structure is a polymer, the polymer has a weight-average molecular weight of preferably from 1,000 to 500,000, more preferably from 5,000 to 300,000, and most preferably from 10,000 to 200,000. The polymer having a cage structure may be included in the film-forming composition as a resin composition having a molecular weight distribution. If the compound having a cage structure is a low-molecular-weight compound, the molecular weight is preferably not more than 3,000, more preferably not more than 2,000, and most preferably not more than 1,000.

The cage structure in the first aspect of the invention may be incorporated onto the polymer backbone as a pendant group having a valence of 1 or more. Preferred examples of the polymer backbone to which the cage structure is bonded include conjugated unsaturated bond chains such as poly(arylene), poly(arylene ether), poly(ether) and polyacetylene; and polyethylene. Of these, poly(arylene ether) and polyacetylene are more preferred on account of their good heat resistance.

In the first aspect of the invention, it is preferable for the cage structure to be part of the polymer backbone. Having the cage structure be part of the polymer backbone means that removing the cage structure from the polymer will result in cleavage of the polymer chain. In this embodiment, the cage structures are either linked directly to each other by single bonds or through suitable linkage groups having a valence of 2 or more. Illustrative examples of linkage groups include —C($R_{11}$)($R_{12}$)—, —C($R_{13}$)═C($R_{14}$)—, —C≡C—, arylene groups, —CO—, —O—, —SO$_2$—, —N($R_{15}$)—, —Si($R_{16}$)($R_{17}$)— and groups that are combinations thereof. Here, $R_{11}$ to $R_{17}$ are each independently a hydrogen atom, alkyl group, alkenyl group, alkynyl group, aryl group or alkoxy group. These linkage groups may be substituted with substituents, preferred examples of which include the substituents mentioned above. Of the above, preferred linkage groups include —C($R_{11}$)($R_{12}$)—, —C═C—, —C≡C—, arylene groups, —O—, —Si($R_{16}$)($R_{17}$)— and groups that are combinations thereof. —C═C—, —C≡C—, —O—, —Si($R_{16}$)($R_{17}$)— and groups that are combinations thereof are especially preferred.

In the first aspect of the invention, the compound having an alicyclic hydrocarbon structure may include on the molecule one type of cage structure or may include thereon two or more types of cage structures.

Illustrative examples of the compound having an alicyclic hydrocarbon structure in the first aspect of the invention include, but are not limited to, the following.

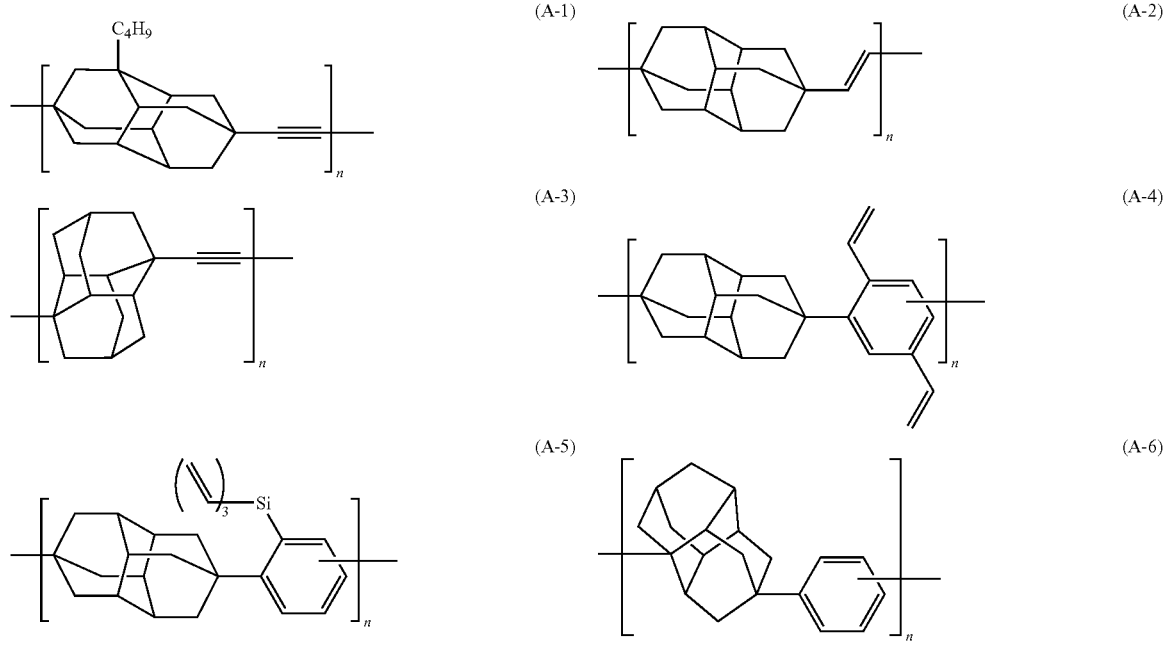

-continued
(A-7)
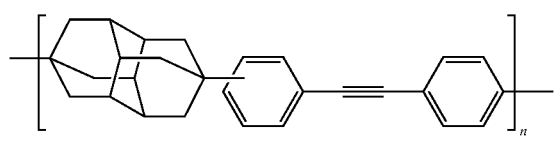
(A-8)
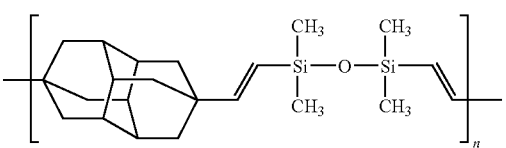
(A-9)
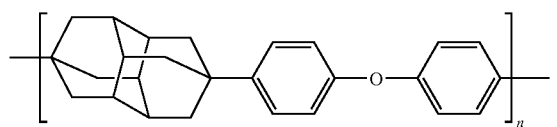
(A-10)
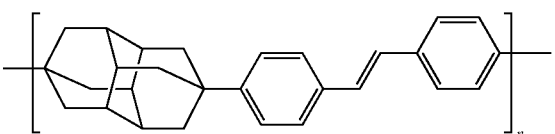
(A-11)
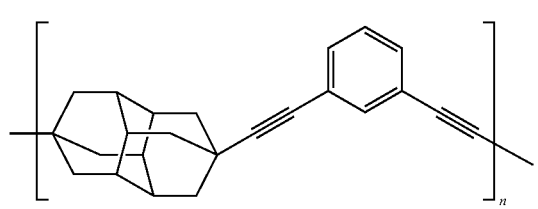
(A-12)
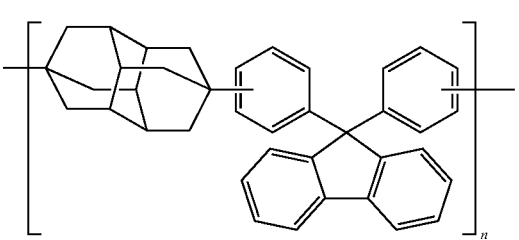
(A-13)
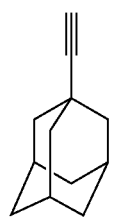
(A-14)
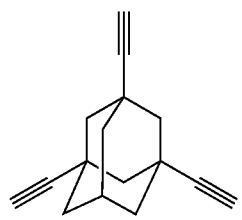
(A-15)
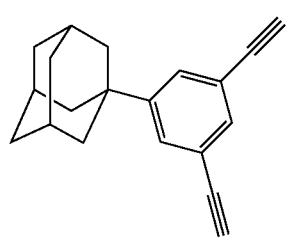
(A-16)
(A-17)
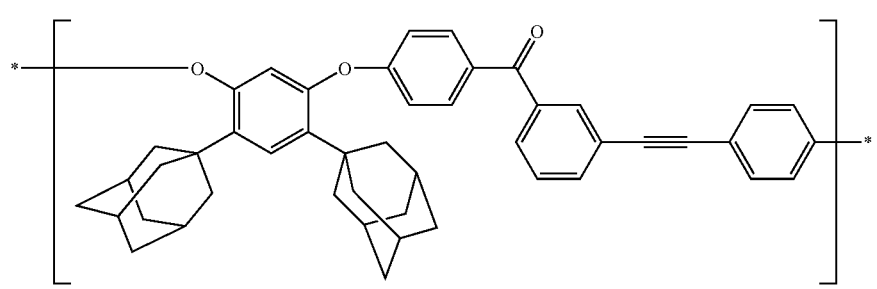

-continued
(A-18)
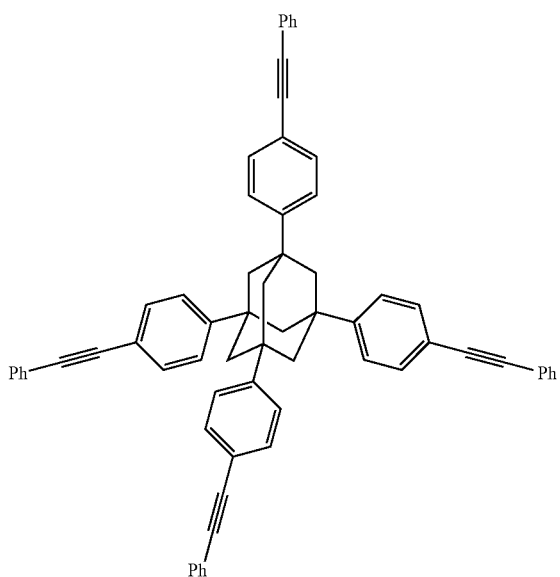
(A-19)
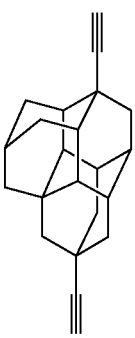
(A-20)
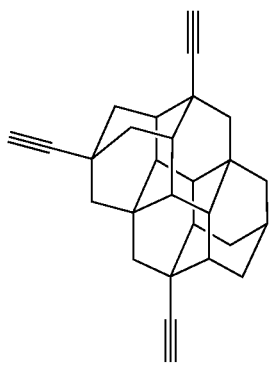
(A-21)
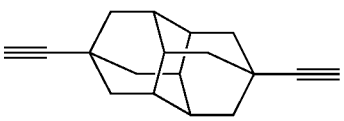
(A-22)
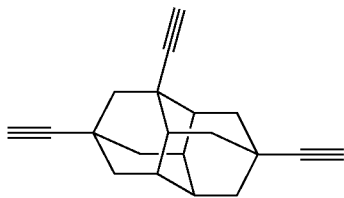
(A-23)
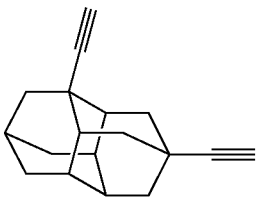
(A-24)
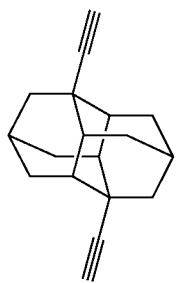
(A-25)
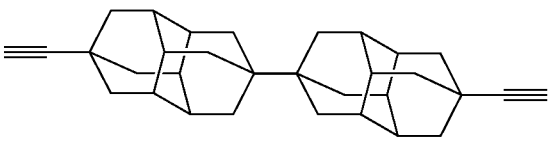

-continued

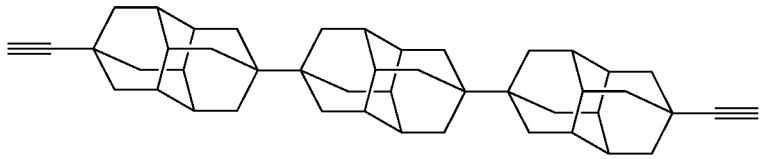
(A-26)

Compound of General Formula (A)

From the standpoint of the heat resistance and mechanical strength of the film, it is most preferable for the compound having an alicyclic hydrocarbon structure in the first aspect of the invention to be a polymer of a compound of general formula (A) below.

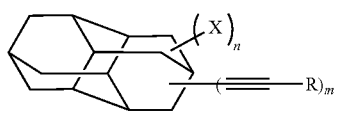
formula (A)

In general formula (A), each occurrence of R is independently a hydrogen atom, alkyl, alkenyl, alkynyl, aryl or silyl; each occurrence of X is independently a halogen atom, alkyl, alkenyl, aryl or silyl; the letter m is an integer from 1 to 14; and the letter n is an integer from 0 to 13.

In general formula (A), R is preferably a hydrogen atom, an alkyl group of 1 to 10 carbons, an alkenyl group of 2 to 10 carbons, an alkynyl group of 2 to 10 carbons, an aryl group of 6 to 20 carbons, or a silyl group of 0 to 20 carbons. R is more preferably a hydrogen atom, an alkyl group of 1 to 10 carbons, an aryl group of 6 to 20 carbons, or a silyl group of 0 to 20 carbons; and is even more preferably a hydrogen atom or a silyl group of 0 to 10 carbons. Moreover, R may itself be substituted with another substituent. Illustrative examples of suitable substituents include halogen atoms (fluorine, chlorine, bromine or iodine), alkyl groups, alkenyl groups, alkynyl groups, aryl groups, acyl groups, aryloxy groups, arylsulfonyl groups, nitro groups, cyano groups and silyl groups.

In general formula (A), X is preferably a halogen atom, an alkyl group (preferably having 1 to 10 carbons), an alkenyl group (preferably having 2 to 10 carbons), an aryl group (preferably having 6 to 20 carbons), or a silyl group (preferably having 0 to 20 carbons). Moreover, X may itself be substituted with another substituent, examples of which include those mentioned above. X is more preferably a fluorine atom, a chlorine atom, a bromine atom, an alkyl group of 1 to 10 carbons, an alkenyl group of 2 to 10 carbons or a silyl group of 0 to 20 carbons; and even more preferably a bromine atom, an alkenyl group of 2 to 4 carbons or a silyl group of 0 to 10 carbons.

In general formula (A), the letter m is an integer from 1 to 14, preferably an integer from 1 to 4, more preferably an integer from 1 to 3, and most preferably 2 or 3. In general formula (A), the letter n is an integer from 0 to 13, preferably an integer from 0 to 3, more preferably at integer from 0 to 2, and most preferably 0 or 1.

The compound represented by general formula (A) is synthesized by reacting commercially available diamantane as the starting material with bromine in the presence or absence of aluminum bromide catalyst so as to insert a bromine atom at a given position, then carrying out a Friedel-Crafts reaction with vinyl bromide in the presence of a Lewis acid such as aluminum bromide, aluminum chloride or iron chloride so as to introduce a 2,2-dibromoethyl group, and subsequently converting this group to an ethynyl group by dehydrobromination with a strong base. Such synthesis may be carried out in accordance with the methods described in, for example, *Macromolecules*, 24, 5266-5268 (1991); *Macromolecules*, 28, 5554-5560 (1995); or *Journal of Organic Chemistry*, 39, 2995-3003 (1974). Alternatively, the hydrogen atom on the terminal acetylene group may be converted to an anion with butyllithium or the like, then reacted with an alkyl halide or a silyl halide so as to introduce an alkyl group or a silyl group.

Examples of the compound of general formula (A) include, but are not limited to, the following.

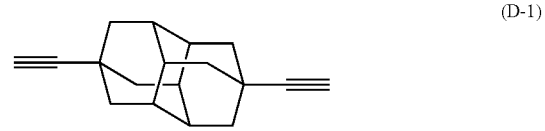
(D-1)

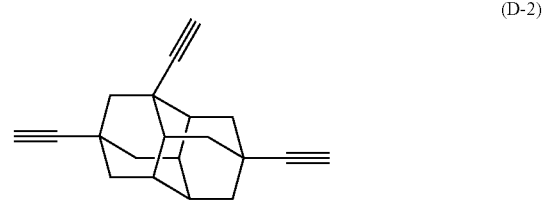
(D-2)

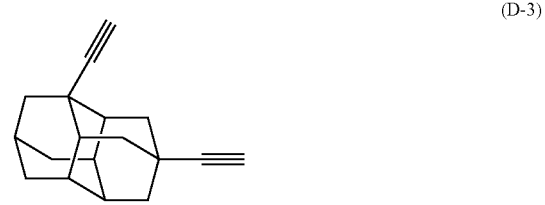
(D-3)

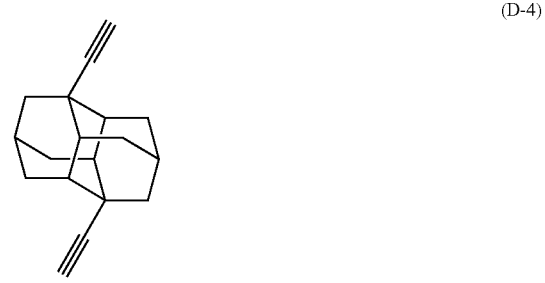
(D-4)

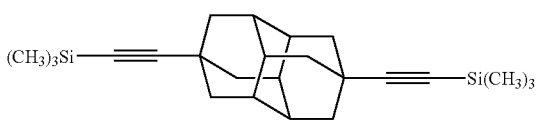
(D-5)

-continued

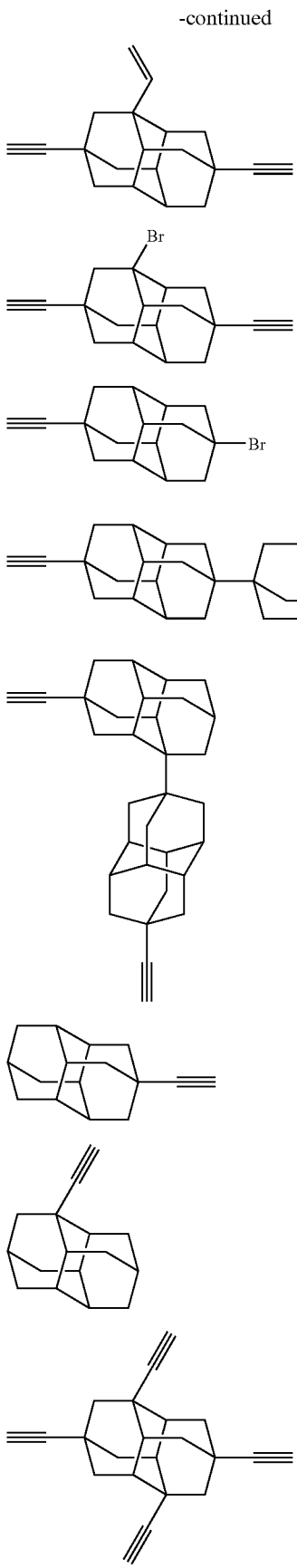

(D-6)
(D-7)
(D-8)
(D-9)
(D-10)
(D-11)
(D-12)
(D-13)

-continued

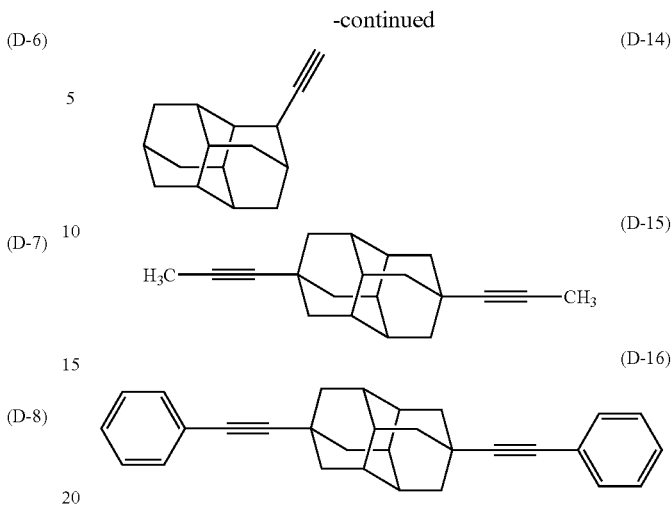

(D-14)
(D-15)
(D-16)

Polymer of Compound of General Formula (A)

The organic solvent used in the polymerization reaction on the compound of general formula (A) may be any solvent that is capable of dissolving the starting monomer and does not exert an adverse influence on the properties of the film formed from the resulting polymer. Examples of solvents that may be used for this purpose include ketone solvents such as acetone, methyl ethyl ketone, methyl isobutyl ketone, cyclohexanone and acetophenone; ester solvents such as ethyl acetate, butyl acetate, propylene glycol monomethyl ether acetate, γ-butyrolactone and methyl benzoate; ether solvents such as dibutyl ether and anisole; aromatic hydrocarbon solvents such as toluene, xylene, mesitylene and 1,3,5-triisopropylbenzene; amide solvents such as N-methylpyrrolidinone and dimethylacetamide; halogenated solvents such as carbon tetrachloride, dichloromethane, chloroform, 1,2-dichloroethane, chlorobenzene, 1,2-dichlorobenzene and 1,2,4-trichlorobenzene; and aliphatic hydrocarbon solvents such as hexane, heptane, octane and cyclohexane.

Of the above solvents, acetone, methyl ethyl ketone, methyl isobutyl ketone, cyclohexanone, acetophenone, ethyl acetate, propylene glycol monomethyl ether acetate, γ-butyrolactone, anisole, tetrahydrofuran, toluene, xylene, mesitylene, 1,3,5-triisopropylbenzene, 1,2-dichloroethane, chlorobenzene, 1,2-dichlorobenzene and 1,2,4-trichlorobenzene are preferred; tetrahydrofuran, γ-butyrolactone, anisole, toluene, xylene, mesitylene, 1,3,5-triisopropylbenzene, 1,2-dichloroethane, chlorobenzene, 1,2-dichlorobenzene and 1,2,4-trichlorobenzene are more preferred; and γ-butyrolactone, anisole, mesitylene, 1,3,5-triisopropylbenzene, 1,2-dichlorobenzene and 1,2,4-trichlorobenzene are especially preferred. These may be used singly or as mixtures of two or more thereof. The organic solvent used for the reaction has a boiling point of preferably at least 50° C., more preferably at least 100° C., and most preferably at least 150° C. The reaction solution has a concentration of preferably from 1 to 50 wt %, more preferably from 5 to 30 wt %, and most preferably from 10 to 20 wt %.

The polymerization reaction on the compound of general formula (A) arises by means of a polymerizable radical such as a triple bond. As used herein, "polymerizable radical" refers to a reactive substituent which brings about the polymerization of the compound of general formula (A). Use may be made of any suitable type of polymerization reaction, such as radical polymerization, cationic polymerization, anionic polymerization, ring-opening polymerization, polycondensation, polyaddition, addition-condensation or transition metal catalyst polymerization. If desired, a metal catalyst such as palladium, nickel, tungsten or molybdenum may be used. Advantageous use may be made of an organic peroxide or an organic azo compound as the polymerization initiator. An organic peroxide is especially preferred for this purpose.

Optimal conditions for the polymerization reaction in the first aspect of the invention vary depending on such factors as the polymerization initiator, the monomer (the compound of general formula (A)), the type of solvent and the reaction concentration, although the internal temperature is preferably from 0 to 200° C., more preferably from 50 to 170° C., and most preferably from 100 to 150° C.; and the reaction time is preferably from 1 to 50 hours, more preferably from 2 to 20 hours, and most preferably from 3 to 10 hours.

To minimize inactivation of the initiator by oxygen, it is preferable to carry out the reaction in an inert gas atmosphere (e.g., nitrogen, argon). The oxygen concentration at the time of the reaction is preferably not more than 100 ppm, more preferably not more than 50 ppm, and most preferably not more than 20 ppm.

The polymer obtained by polymerization has a weight-average molecular weight in a range of preferably from 1,000 to 500,000, more preferably from 5,000 to 300,000, and most preferably from 10,000 to 200,000.

With regard to preparation of the subsequently described film-forming composition, the reaction mixture obtained by subjecting the compound of general formula (A) to a polymerization reaction may be used directly without modification as the film-forming composition, although use following concentration by distilling off the reaction solvent is preferred. Use after carrying out reprecipitation treatment is also preferred.

The above-described compound in the first aspect of the invention preferably has a reactive radical which forms a covalent bond with another molecule under the influence of heat. Such a reactive radical is not subject to any particular limitation, although preferred use may be made of, for example, substituents which induce a cyloaddition reaction or a radical polymerization reaction. For example, groups having a double bond (e.g., vinyl, allyl), groups having a triple bond (e.g., ethynyl, phenylethynyl), and combinations of a diene group and a dienophile group for inducing a Diels-Alder reaction are effective for this purpose. Ethynyl groups and phenylethynyl groups are especially effective.

Because nitrogen atoms increase molar polarizability and are a cause of moisture absorption by the insulating film, and thus tend to increase the dielectric constant of the film, it is preferable for the above-described compound in the first aspect of the invention to contain no nitrogen atoms. In particular, given that a sufficiently low dielectric constant cannot be achieved with a polyimide compound, the compound having a cage structure in the first aspect of the invention is preferably a compound other than a polyimide; i.e., a compound which does not have a polyimide bond or an amide bond.

Film-Forming Composition

The film-forming composition in the first aspect of the invention includes a compound having an alicyclic hydrocarbon structure, and optional ingredients such as an organic solvent and the subsequently described additives.

The film-forming composition in the first aspect of the invention may include an organic solvent, and may be advantageously used as a coating solution. Organic solvents that may be used are not subject to any particular limitation. Illustrative examples include alcohol solvents such as methanol, ethanol, 2-propanol, 1-butanol, 2-ethoxymethanol, 3-methoxypropanol and 1-methoxy-2-propanol; ketone solvents such as acetone, acetylacetone, methyl ethyl ketone, methyl isobutyl ketone, 2-pentanone, 3-pentanone, 2-heptanone, 3-heptanone, cyclopentanone and cyclohexanone; ester solvents such as ethyl acetate, propyl acetate, butyl acetate, isobutyl acetate, pentyl acetate, ethyl propionate, propyl propionate, butyl propionate, isobutyl propionate, propylene glycol monomethyl ether acetate, methyl lactate, ethyl lactate and γ-butyrolactone; ether solvents such as diisopropyl ether, dibutyl ether, ethyl propyl ether, anisole, phenetole and veratrole; aromatic hydrocarbon solvents such as mesitylene, ethylbenzene, diethylbenzene, propylbenzene and t-butylbenzene; and amide solvents such as N-methylpyrrolidinone and dimethylacetamide. These may be used singly or as mixtures of two or more thereof. The coating solvent is more preferably 1-methoxy-2-propanol, propanol, acetylacetone, cyclohexanone, propylene glycol monomethyl ether acetate, butyl acetate, methyl lactate, ethyl lactate, γ-butyrolactone, anisole, mesitylene or t-butylbenzene; and most preferably 1-methoxy-2-propanol, cyclohexanone, propylene glycol monomethyl ether acetate, ethyl lactate, γ-butyrolactone, t-butylbenzene or anisole. The film-forming composition in the first aspect of the invention has a solids concentration, based on the total weight of the composition, of preferably from 1 to 50 wt %, more preferably from 2 to 15 wt %, and most preferably from 3 to 10 wt %. As used herein, "solids" refers to the total solids which make up the film obtained by coating this film-forming composition onto a substrate. Substances such organic solvents which do not remain within the film following film formation are not included in the solids.

Also, additives such as radical generators, nonionic surfactants, nonionic fluorochemical surfactants and silane coupling agents may be added to the film-forming composition in the first aspect of the invention insofar as the properties of the resulting film (heat resistance, dielectric constant, mechanical strength, coating properties, adhesion, etc.) are not thereby compromised.

Illustrative examples of radical generators include t-butyl peroxide, pentyl peroxide, hexyl peroxide, lauroyl peroxide, benzoyl peroxide and azobisisobutyronitrile.

Illustrative examples of nonionic surfactants include octyl polyethylene oxide, decyl polyethylene oxide, dodecyl polyethylene oxide, octyl polypropylene oxide, decyl polypropylene oxide and dodecyl polypropylene oxide.

Illustrative examples of fluorochemical surfactants and/or silicone surfactants (i.e., fluorochemical surfactants, silicone surfactants, and surfactants containing both fluorine atoms and silicon atoms) include the surfactants mentioned in JP 62-36663 A, JP 61-226746 A, JP 61-226745 A, JP 62-170950 A, JP 63-34540 A, JP 7-230165 A, JP 8-62834 A, JP 9-54432 A, JP 9-5988 A, JP 2002-277862 A, U.S. Pat. No. 5,405,720, U.S. Pat. No. 5,360,692, U.S. Pat. No. 5,529,881, U.S. Pat. No. 5,296,330, U.S. Pat. No. 5,436,098, U.S. Pat. No. 5,576,143, U.S. Pat. No. 5,294,511 and U.S. Pat. No. 5,824,451. It is also possible to use without modification the commercial surfactants mentioned below.

Examples of commercial surfactants that can be used include the following fluorochemical surfactants and silicone surfactants: F-Top EF301 and EF303 (manufactured by Shin Akita Kasei K K), Fluorad FC430 and FC431 (available from Sumitomo 3M, Ltd.), Megafac F171, F173, F176, F189 and R08 (available from Dainippon Ink & Chemicals, Inc.), Surflon S-382, SC101, 102, 103, 104, 105 and 106 (available from Asahi Glass Co., Ltd.), and Troysol S-366 (available from Troy Chemical). In addition, the polysiloxane polymer KP-341 (available from Shin-Etsu Chemical Co., Ltd.) may be used as a silicone surfactant.

Aside from known surfactants such as those mentioned above, use may also be made of surfactants which employ a fluoroaliphatic group-containing polymer derived from a fluoroaliphatic compound synthesized by the telomerization process (also referred to as the "telomer process") or the oligomerization process (also referred to as the "oligomer process"). The fluoroaliphatic compound may be synthesized by the method described in JP 2002-90991 A.

The polymer having a fluoroaliphatic group is preferably a copolymer of a fluoroaliphatic group-containing monomer with a (poly(oxyalkylene)) acrylate and/or a (poly(oxyalkylene)) methacrylate within which the monomers may be distributed without order or which may be block copolymerized. The poly(oxyalkylene) groups are exemplified by poly(oxyethylene) groups, poly(oxypropylene) groups and poly(oxybutylene) groups, and also by units composed of alkylenes having different chain length within the same backbone, such as poly(oxyethylene-oxypropylene-oxyethylene tri-blocks) and poly(oxyethylene-oxypropylene di-blocks). Moreover, such copolymers of a fluoroaliphatic group-containing monomer with a (poly(oxyalkylene)) acrylate or methacrylate are not limited only to binary copolymers, and include also ternary or higher copolymers obtained by the concurrent copolymerization of, for example, two or more different fluoroaliphatic group-containing monomers or two or more different poly(oxyalkylene)) acrylates or methacrylates.

Illustrative examples of commercial surfactants include Megafac F178, F-470, F-473, F-475, F-476 and F-472 (available from Dainippon Ink & Chemicals, Inc.). Additional examples include copolymers of a $C_6F_{13}$ group-containing acrylate (or methacrylate) with a (poly(oxyalkylene)) acrylate (or methacrylate), copolymers of a $C_6F_{13}$ group-containing acrylate (or methacrylate) with a (poly(oxyethylene)) acrylate (or methacrylate) and a (poly(oxypropylene)) acrylate (or methacrylate), copolymers of a $C_8F_{17}$ group-containing acrylate (or methacrylate) with a (poly(oxyalkylene)) acrylate (or methacrylate), and copolymers of a $C_8F_{17}$ group-containing acrylate (or methacrylate) with a (poly(oxyethylene)) acrylate (or methacrylate) and a (poly(oxypropylene)) acrylate (or methacrylate).

Illustrative examples of silane coupling agents include vinyltrimethoxysilane, vinyltriethoxysilane, vinyltriacetoxysilane, allyltrimethoxysilane, allyltriethoxysilane, divinyldiethoxysilane, trivinylethoxysilane, and hydrolyzates or dehydrative condensation products thereof.

The above additives are included in amounts within suitable ranges depending on the intended purposes of the additives or the solids concentration of the coating solution, although the amount of additives, based on the weight of the film-forming composition, is generally from 0.001 to 10 wt %, more preferably from 0.01 to 5 wt %, and most preferably from 0.05 to 2 wt %.

From the standpoint of imparting the film of the first aspect of the invention with desirable properties (dielectric constant, mechanical strength), it is desirable for the total number of carbons to account for preferably at least 70%, more preferably at least 75%, and even more preferably at least 80% of the number of atoms of all elements in the total solids present in the film-forming composition. Here, "total solids present in the film-forming composition" refers to the total solids which make up the film obtained by applying this composition to a substrate. Substances such as organic solvents and blowing agents which do not remain within the film following film formation are not included in the solids.

The film-forming composition is preferably used in film formation after insolubles and gel-like components have been removed by filtration with a filter. The pore size of the filter used at this time is preferably from 0.01 to 2 μm, more preferably from 0.01 to 0.5 μm, and most preferably from 0.01 to 0.3 μm. The filter material is preferably PTFE, polyethylene or nylon, and more preferably polyethylene or nylon.

The above-described film-forming composition is applied to a substrate by any suitable method, such as spin coating, roller coating, dip coating, nozzle-scan coating, spraying or bar coating. Following application, the solvent may be removed by subjecting the applied composition to heating or drying treatment. The method for applying the composition to a substrate is preferably spin coating or nozzle-scan coating, and most preferably spin coating. A commercial apparatus may be used to carry out spin coating. For example, advantageous use may be made of any apparatus from the Clean Track series (manufactured by Tokyo Electron Ltd.), the D-Spin series (Dainippon Screen Mfg. Co., Ltd.), or the SS series or CS series (Tokyo Ohka Kogyo Co., Ltd.). Drying treatment is carried out under temperature conditions at which the film does not cure. Specifically, heating to remove the solvent by drying is preferably carried out at from 100 to 250° C. for a period of at least 1 minute but less than 5 minutes. Drying treatment may be carried out by dividing the operation into a plurality of steps performed under different conditions. The drying atmosphere is not subject to any particular limitation, and may be selected as appropriate. For example, drying may be carried out in air or in an inert gas (e.g., nitrogen, argon). From the standpoint of substrate transport, it is desirable to carry out treatment which ensures that no film remains on the edge of the substrate, such as edge bead removal and backside rinse.

The substrate used is not subject to any particular limitation. For example, a silicon wafer, $SiO_2$ wafer, SiN wafer, glass substrate, ceramic substrate or plastic substrate may be selected according to the intended use. A substrate having metal interconnects, such as a semiconductor integrated circuit having copper-containing interconnects, is preferred.

The thickness of the film, while not subject to any particular limitation, is preferably from 0.001 to 100 μm, more preferably from 0.01 to 10 μm, and even more preferably from 0.1 to 1 μm.

Microwave Irradiation

The film according to the first aspect of the invention is formed by exposing a coat of the film-forming composition containing an alicyclic hydrocarbon structure applied to the substrate to microwaves having a frequency of 5.8 GHz. The microwave frequency used here refers to a frequency of 5,800±75 MHz in the 5.8 GHz band, which is an ISM band.

A suitable and optimal microwave irradiation time is selected based on, for example, the compound having an alicyclic hydrocarbon structure.

The substrate temperature at the time of microwave irradiation is preferably from 250 to 450° C., more preferably from 250 to 400° C., and even more preferably from 250 to 350° C. To prevent the polymer of the invention from oxidizing, it is preferable to use an inert atmosphere of argon, helium, nitrogen or the like as the atmosphere near the substrate. The pressure at the time of microwave irradiation is preferably from 0 to 133 kPa.

Heat treatment may be carried out at the same time as microwave irradiation treatment or subsequent thereto. The heating method is not subject to any particular limitation, although use may be made of a commonly employed technique such as hotplate heating, a heating method that uses a furnace, or photoradiation heating by means of a xenon lamp, such as with a rapid thermal processor (RTP). Heat treatment is typically carried out at a temperature of preferably from 300 to 450° C., more preferably from 300 to 420° C., and even more preferably from 350 to 400° C., for a period of preferably from 1 minute to 2 hours, more preferably from 10 minutes to 1.5 hours, and most preferably from 30 minutes to 1 hour. Heat treatment may be carried out in a plurality of divided steps. Any step that includes heating at a temperature of 300° C. or above serves as a heating step, although it is also possible to carry out the above-mentioned drying step and heating step in a consistent manner following spin coating.

More specifically, an insulating film having a low dielectric constant can be formed by using a spin coating technique to apply the film-forming composition to a substrate (typically a substrate having metal interconnects), removing the solvent by carrying out preheating treatment to effect drying, then subjecting the applied composition to microwave irradiation.

It is also possible to form a porous film by adding a blowing agent beforehand to the insulating film-forming coating solution used in the first aspect of the invention. The blowing agent added so as to form a porous film, while not subject to any particular limitation, is exemplified by organic compounds that are higher boiling than the solvent in the coating solution, pyrolyzable low-molecular-weight compounds and pyrolyzable polymers. The blowing agent is generally added in an amount which is appropriate for the solids concentration of the coating solution; namely, an amount that is preferably from 0.01 to 20 wt %, more preferably from 0.1 to 10 wt %, and most preferably from 0.5 to 5 wt %, of the coating solution.

In the first aspect of the invention, a film having excellent film properties such as dielectric constant and mechanical strength can be obtained by coating a substrate with a film-forming composition which contains a compound having an alicyclic hydrocarbon structure, then irradiating the resulting coat with microwaves having a frequency of 5.8 GHz. Although the detailed mechanism of the present invention is not well understood, a crosslinked structure is thought to form among the constituents of the composition as a result both of reactions involving reactive radicals such as carbon-carbon double bonds or carbon-carbon triple bonds remaining in the film composition and of hydrogen abstraction. Unlike conventional heat-setting treatment, the microwaves penetrate to the interior of the film, forming a crosslinked structure. In particular, because the frequency of 5.8 GHz is high, the energy level is also high, enabling treatment to proceed in a shorter period of time.

Second Aspect

The insulating film and method of manufacture thereof according to the second aspect of the invention is described in detail below.

The insulating film according to the second aspect of the invention is formed by irradiating a film containing a compound having a siloxane structure with microwaves having a frequency of 5.8 GHz. The insulating film according to the second aspect of the invention is suitable for use as an interlayer dielectric in, e.g., semiconductor devices, and is also suitable for use as a low refractive index film in optical devices. Here, "film containing a compound having a siloxane structure" refers to a film containing a compound having siloxane bonds (Si—O) composed of silicon atoms and oxygen atoms. Such a film is expected to have an excellent heat resistance and mechanical properties, and also low dielectric properties. There are basically two types of methods of forming such films: chemical vapor deposition processes of film formation, such as plasma CVD; and coating processes in which a film-forming composition containing a compound having a siloxane structure, preferably a cage-type silsesquioxane compound, and more preferably a polymer of a cage-type silsesquioxane compound, is coated onto a substrate and formed into a film by spin-coating. Of these, coating processes are preferable on account of their low cost and high productivity.

CVD Process

The film containing a compound having a siloxane structure of the second aspect of the invention can be produced by a CVD process, such as a plasma CVD process. "Plasma CVD process" refers herein to a process in which a reaction gas is rendered into a low-temperature plasma state and decomposed into chemically active ions and radicals to form a film. Any commonly used plasma CVD process may be employed, such as a parallel plate-type plasma film-forming apparatus. TEOS (tetramethoxysilane)-$O_2$ gas may be used as the reaction gas, and a silicon-containing film which includes $SiO_2$, SiOC or the like may be obtained. Suitable and optimal film-forming conditions are selected according to such considerations as the reaction gas and apparatus which are used.

Coating Process

"Coating process" refers herein to a process in which a film-forming composition containing a compound having a siloxane structure, preferably a cage-type silsesquioxane compound, and more preferably a polymer of a cage-type silsesquioxane compound of general formula (1) below, is applied to a substrate by a technique such as spin-coating so as to form a coat.

Compound Having Siloxane Structure

The compound having a siloxane structure according to the second aspect of the invention is a compound having a siloxane bond (Si—O bond). Compounds having a siloxane structure include low-molecular-weight compounds and high-molecular-weight compounds. Any compound having a siloxane structure may be used, insofar as the objects of the invention are attainable.

From the standpoint of low dielectric properties and excellent mechanical properties, the compound having a siloxane structure is preferably a silsesquioxane compound. Silsesquioxane compounds are compounds having at least a silsesquioxane structure. A silsesquioxane structure is a structure in which each silicon atom is bonded with three oxygen atoms, and each oxygen atom is bonded with two silicon atoms (the ratio of the number of oxygen atoms to the number of silicon atoms is 1.5). Silsesquioxane compounds are exemplified by ladder-type compounds, cage-type compounds, incomplete cage-type compounds in which part of the cage structure is missing, and mixtures thereof. From the standpoint of heat resistance and other considerations, a cage-type structure is preferred. It is desirable for the silsesquioxane compound to have an unsaturated group such as a vinyl group or an ethynyl group because of the substantial improvement in performance from the subsequently described microwave irradiation when such a group is present. Also, "cage" denotes a structure which has a cavity that is defined by a plurality of rings formed of covalently bonded atoms and in which any point positioned within the cavity cannot leave the cavity without passing through the rings.

Preferred forms of the foregoing silsesquioxane compound include polymers of cage-type silsesquioxane compound of the following general formula (1) on account of their excellent heat resistance.

$$(R_1SiO_{3/2})_n \qquad (1)$$

In general formula (1), each occurrence of $R_1$ is independently a non-hydrolyzable group, with the proviso that at least two occurrences of $R_1$ are groups containing vinyl or ethynyl; and the letter n is an integer from 8 to 16.

In general formula (1), $R_1$ represents a non-hydrolyzable group. Non-hydrolyzable groups are groups which, when placed in contact with one equivalent of neutral water for one hour, remain at least 95% unchanged. Groups which remain at least 99% unchanged under these conditions are preferred. Exemplary non-hydrolyzable groups include substituted or unsubstituted hydrocarbon groups, silicon atom-containing groups, and groups that are combinations thereof. "Hydrocarbon groups" refers herein to aliphatic hydrocarbon groups and aryl groups. Exemplary aliphatic hydrocarbon groups include alkyl groups, alkenyl groups and alkynyl groups. Each occurrence of $R_1$ may be the same or different.

Alkyl groups are not subject to any particular limitation, and may be linear, branched or cyclic. Illustrative examples include methyl, tert-butyl, cyclopentyl and cyclohexyl.

Alkenyl groups are not subject to any particular limitation, and may be linear, branched or cyclic. Illustrative examples include vinyl and allyl.

Alkynyl groups are not subject to any particular limitation, and may be linear, branched or cyclic. An illustrative example is ethynyl.

Aryl groups are not subject to any particular limitation provided they are rings having aromaticity. Illustrative examples include phenyl, 1-naphthyl and 2-naphthyl.

Silicon atom-containing groups are not subject to any particular limitation provided they contain silicon. Groups of general formula (2) are preferred.

$$\text{*-}L_1\text{-Si}\text{—}(R_2)_3 \tag{2}$$

In general formula (2), $L_1$ is an alkylene group, —O—, —S—, —Si($R_{11}$)($R_{12}$)—, —N($R_{13}$)— or a divalent linkage group that is a combination thereof. Here, $R_{11}$, $R_{12}$, $R_{13}$ and $R_2$ are each independently alkyl, alkenyl or alkynyl. The symbol * represents a bonding position with the silicon atom.

As noted above, in general formula (2), $L_1$ is an alkylene group, —O—, —S—, —Si($R_{11}$)($R_{12}$)—, —N($R_{13}$)— or a divalent linkage group that is a combination thereof. Of these, an alkylene group, —O— or a divalent linkage group that is a combination thereof is preferred.

The alkyl, alkenyl and alkynyl groups represented by $R_{11}$, $R_{12}$, $R_{13}$ and $R_2$ in general formula (2) are defined in the same way as $R_1$ above. Preferred examples of each include methyl, vinyl and ethynyl. Illustrative examples of the group represented by general formula (2) include silyloxy groups such as trimethylsilyloxy, triethylsilyloxy and t-butyldimethylsilyloxy.

In general formula (2), when $L_1$ is —O— (general formula (3)), synthesis is possible by reacting the compound represented by general formula (4) below with the compound represented by general formula (5). As noted above, the symbol * represents a bonding position with the silicon atom.

$$(R_3)_3\text{—Si—O—*} \tag{3}$$

$$(\text{MO—SiO}_{3/2})_m \tag{4}$$

$$(R_3)_3\text{—Si—Cl} \tag{5}$$

The compound of general formula (4) may be synthesized according to the method described in, for example, Angew. Chem. Int. Ed. Engl., 36, No. 7 743-745 (1997). Each occurrence of $R_3$ in general formulas (3) and (5) is independently a non-hydrolyzable group. This non-hydrolyzable group has the same definition as the non-hydrolyzable group represented by $R_1$ above. The letter m in general formula (4) has the same definition as the letter n in general formula (1). In general formula (4), M represents a metal atom (e.g., sodium, potassium, copper, nickel, manganese) or an onium cation (e.g., tetramethylammonium). When M is a polyvalent metal atom, this means that a plurality of —O—SiO$_{3/2}$ moieties bond to the polyvalent metal atom M. The reaction between a compound of general formula (4) and a compound of general formula (5) is effected by, for example, adding to a solvent both a compound of general formula (4) and from 1 to 100 moles of the compound of general formula (5) per mole of the Si—OM groups in the compound of general formula (4), and carrying out the reaction for a period of from 10 minutes to 20 hours at generally from 0 to 180° C. under stirring. The solvent is preferably an organic solvent such as toluene, hexane or tetrahydrofuran (THF).

In general formula (1), the group containing vinyl or ethynyl is preferably vinyl, ethynyl or a group of general formula (6) below. Of these, from the standpoint of the ease of controlling the molecular weight, vinyl and ethynyl are preferred.

$$\text{*-}L_2\text{-}R_4 \tag{6}$$

In formula (6), $L_2$ is an alkylene group, —O—, —S—, —Si($R_{21}$)($R_{22}$)—, —N($R_{23}$)—, —O—Si($R_{24}$)($R_{25}$)— or a divalent linkage group that is a combination thereof. $R_{21}$ to $R_{25}$ are each independently a hydrogen atom, methyl, ethyl or phenyl; $R_4$ is vinyl or ethynyl; and the symbol * is a bonding position with the silicon atom.

As noted above, in general formula (6), $L_2$ represents an alkylene group, —O—, —S—, —Si($R_{21}$)($R_{22}$)—, —N($R_{23}$)—, —O—Si($R_{24}$)($R_{25}$)— or a divalent linkage group that is a combination thereof. Of these, an alkylene group, —O—, —O—Si($R_{24}$)($R_{25}$)— or a divalent linkage group that is a combination thereof is preferred. As noted above, $R_{21}$ to $R_{25}$ are each independently a hydrogen atom, methyl, ethyl or phenyl.

In general formula (1), the letter n is an integer from 8 to 16, preferably from 8 to 12, and more preferably 8.

In the compound represented by general formula (1), it is preferable for at least two of the $R_1$ moieties to be vinyl groups, it is even more preferable for at least half of the $R_1$ moieties to be vinyl groups, and it is most preferable for all of the $R_1$ moieties to be vinyl groups.

The cage-type silsesquioxane compound of general formula (1) can also be represented as the cage-type silsesquioxane compound of general formula (7) below.

$$(R_5\text{SiO}_{3/2})_{p-q}(R_6\text{SiO}_{3/2})_q \tag{7}$$

In general formula (7), $R_5$ is a non-hydrolyzable group, $R_6$ is a group which includes vinyl or ethynyl; the letter p is an integer from 8 to 16; and the letter q is an integer from 2 to p.

In general formula (7), the letter p is an integer from 8 to 16, preferably from 8 to 12, and most preferably 8. The letter q is an integer from 2 to p, preferably from 4 to p, and more preferably from 8 to p. For example, when p is 8 and q is 8, general formula (7) may represent the following structure.

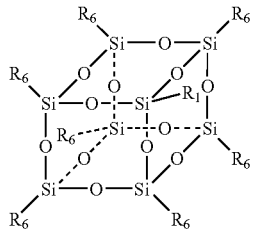

Illustrative, non-limiting, examples of cage-type silsesquioxane compounds represented by general formula (1) are shown below.

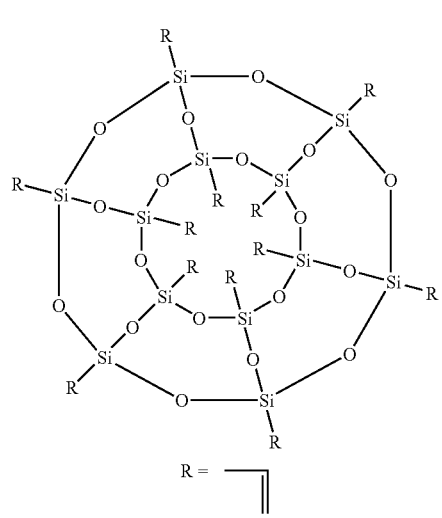
(1-a)
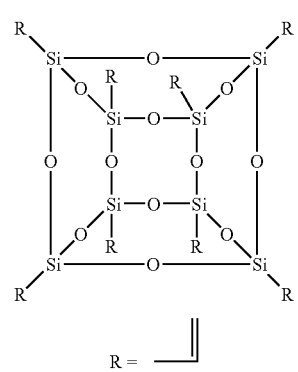
(1-d)
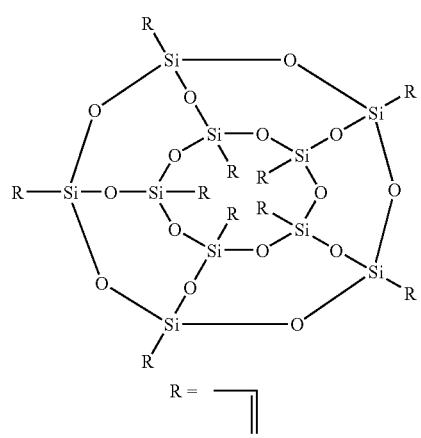
(1-b)
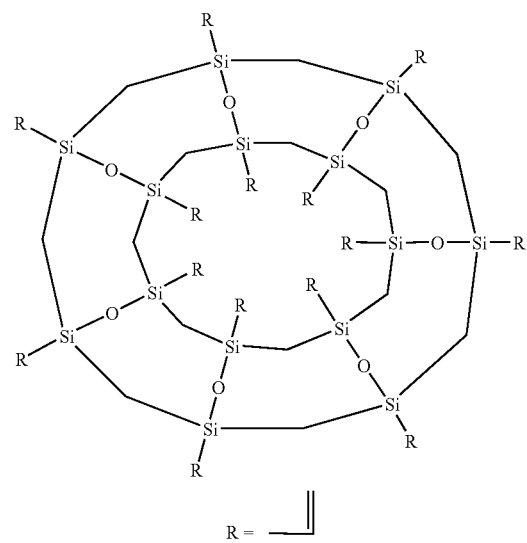
(1-e)
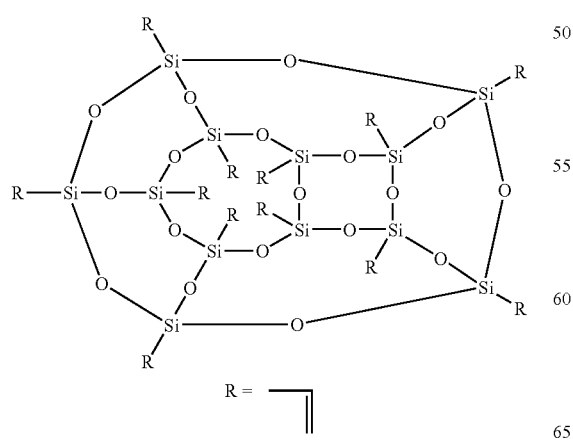
(1-c)
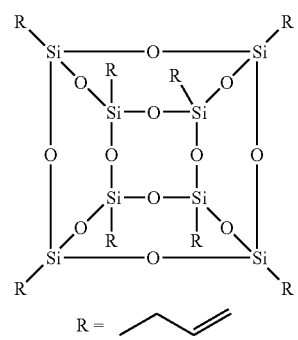
(1-f)

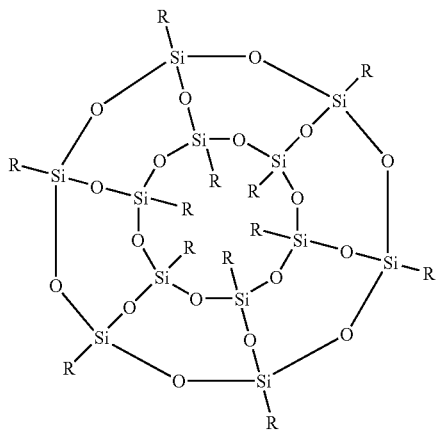
(1-g)

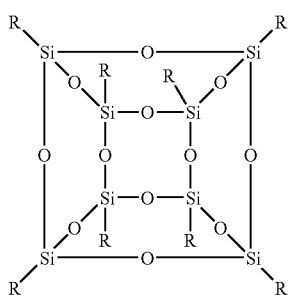
(1-h)

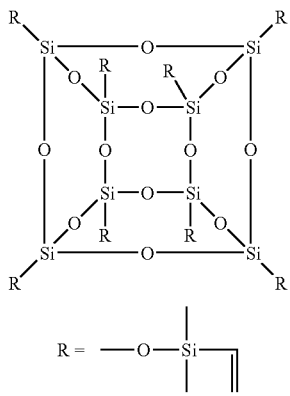
(1-j)

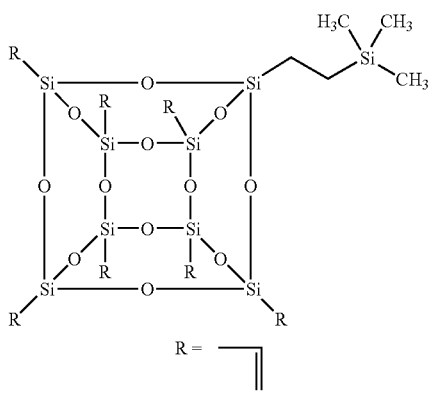
(1-k)

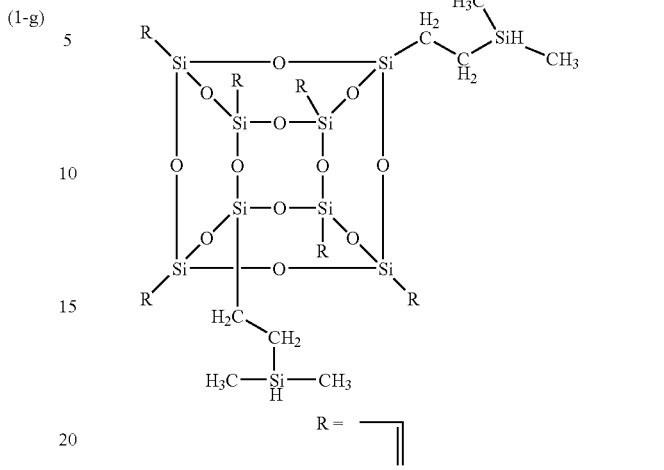
(1-i)

The polymer of the cage-type silsesquioxane compound represented by general formula (1) is preferably synthesized using a polymerization reaction between carbon-carbon unsaturated bonds. It is especially preferable to dissolve the cage-type silsesquioxane of general formula (1) in a solvent, add a polymerization initiator, and react the vinyl or ethynyl groups. Use may be made of any suitable type of polymerization reaction, such as radical polymerization, cationic polymerization, anionic polymerization, ring-opening polymerization, polycondensation, polyaddition, addition-condensation or transition metal catalyst polymerization.

The cage-type silsesquioxane compound of general formula (1) that remains at the completion of the polymerization reaction is preferably not more than 25 wt %, more preferably not more than 20 wt %, and most preferably not more than 15 wt %, of the amount added. By satisfying this condition at the time of polymerization, a film-forming composition which has a good coated surface state and which undergoes little film loss during bake can be produced in a good yield.

The polymer of the cage-type silsesquioxane compound of general formula (1) has, at the completion of the polymerization reaction, a weight-average molecular weight (Mw) of preferably from 30,000 to 180,000, more preferably from 50,000 to 170,000, and most preferably from 70,000 to 160,000. At the completion of the polymerization reaction, the polymer of the cage-type silsesquioxane compound of general formula (1) preferably contains substantially no components with a molecular weight of 3,000,000 or more, more preferably contains substantially no components with a molecular weight of 2,000,000 or more, and most preferably contains substantially no components with a molecular weight of 1,000,000 or more.

The polymerization reaction on the cage-type silsesquioxane compound of general formula (1) is preferably carried out in the presence of a metal-free initiator. For example, polymerization may be carried out in the presence of an initiator which manifests activity by generating free radicals such as carbon radicals or oxygen radicals under heating. The initiator is preferably an organic peroxide or an organic azo compound. Owing to the safety of the reagent itself and the molecule weight reproducibility of the polymerization reaction, an organic azo compound is preferred. An azo ester compound such as V-601 which does not result in the uptake of harmful cyano groups by the polymer is most preferred.

The solvent used in the polymerization reaction may be any suitable solvent which is capable of dissolving the cage-type silsesquioxane compound of general formula (1) to the required concentration and does not impart an adverse influence on the properties of films formed from the resulting polymer. Ester solvents are preferred. Of such solvents, ethyl acetate and butyl acetate are especially preferred.

To enable the reaction mixture to be heated to the temperature required to decompose the initiator at the time of the reaction and to enable the organic solvent to be removed by distillation following reaction completion, it is preferable for the organic solvent to have a boiling point of at least 75° C. but not above 140° C. Techniques for adding the initiator include addition all at once, split addition and continuous addition. Split addition and continuous addition are preferred because a high molecular weight can be achieved with the addition of a smaller amount of initiator; addition in this way is advantageous also from the standpoint of film strength.

Although the optimal conditions for the polymerization reaction in the second aspect of the invention differ according to such factors as the initiator used, the cage-type silsesquioxane compound of general formula (1), the type of solvent and the concentration, the reaction is typically carried out at an interior temperature of preferably from 0 to 200° C., more preferably from 40 to 170° C., and most preferably from 70 to 140° C., and for a period of preferably from 1 to 50 hours, more preferably from 2 to 20 hours, and most preferably from 3 to 10 hours. To suppress inactivation of the initiator by oxygen, it is preferable to carry out the reaction in an inert gas atmosphere (e.g., nitrogen, argon). The oxygen concentration at the time of the reaction is preferably not more than 100 ppm, more preferably not more than 50 ppm, and most preferably not more than 20 ppm.

With regard to preparation of the subsequently described film-forming composition, the reaction mixture resulting from the polymerization reaction on the cage-type silsesquioxane compound of general formula (1) may be used directly without modification as the film-forming composition, although it is preferable to concentration the reaction mixture by distilling off the reaction solvent prior to such use. Alternatively, the reaction mixture may be used as the film-forming composition after first being subjected to reprecipitation treatment.

Another preferred embodiment of the compound having a siloxane structure is a cyclic siloxane compound of general formula (8) below.

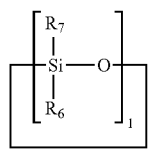

formula (8)

In general formula (8), $R_7$ is vinyl or ethynyl; $R_8$ is an alkyl group; and the letter l is an integer from 3 to 17.

As mentioned above, in general formula (8), $R_7$ is a vinyl group or an ethynyl group. From the standpoint of the ease of controlling the molecular weight, a vinyl group is preferred.

In general formula (8), $R_8$ is an alkyl group. The alkyl group represented by $R_8$ may be linear, branched or cyclic, or may be a polycyclic alkyl group such as a bicycloalkyl group. Illustrative examples include methyl, ethyl, propyl, isopropyl, t-butyl, 2-ethylhexyl, cyclohexyl and cyclopentyl.

In general formula (8), the letter l is an integer from 3 to 17, preferably from 3 to 10, and more preferably from 3 to 8.

The above compound having a siloxane structure may be a commercially available compound or may be synthesized by a known method.

Additives such as radical generators, colloidal silica, surfactants, silane coupling agents and adhesive agents may be added to the film-forming composition containing the compound having a siloxane structure, insofar as such addition does not compromise the properties of the resulting film (e.g., heat resistance, dielectric constant, mechanical strength, coating properties, adhesion).

As used herein, "radical generator" refers to a compound which, when heated or irradiated with light energy, generates the radicals of atoms such as carbon, oxygen or nitrogen. Such a compound has the function of promoting a film-hardening reaction.

The film-forming composition may include colloidal silica, such as a dispersion of high-purity silicic anhydride dispersed in a hydrophilic organic solvent or water and typically having an average particle size of from 5 to 30 nm, preferably from 10 to 20 nm, and a solids concentration of from 5 to 40 wt %.

The film-forming composition may include a surfactant. Illustrative examples include nonionic surfactants, anionic surfactants, cationic surfactants, and also silicone surfactants, fluorochemical surfactants, polyalkylene oxide surfactants and acrylic surfactants. The surfactant used in the present invention may be of one type or of two or more types. The surfactant is preferably a silicone surfactant, nonionic surfactant, fluorochemical surfactant or acrylic surfactant, and most preferably a silicone surfactant. The content of the surfactant used in this invention is preferably from 0.01 to 1 wt %, and more preferably from 0.1 to 0.5 wt %, based on the total weight of the film-forming coating solution.

In the second aspect of the invention, "silicone surfactant" refers to a surfactant containing at least one silicon atom. The silicone surfactant used in the present invention may be any type of silicone surfactant, although one having a structure that includes an alkylene oxide and dimethylsiloxane is preferred. A structure which includes the following chemical formula is even more preferred.

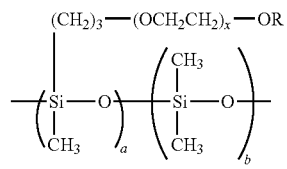

In the above formula, R is a hydrogen atom or an alkyl group of from 1 to 5 carbons, the letter x is an integer from 1 to 20, and the letters a and b are each independently integers from 2 to 100. In cases where a plurality of R moieties are present, these may be the same or different.

Illustrative examples of silicone surfactants which may be used in the second aspect of the invention include BYK306 and BYK307 (both products of BYK-Chemie), SH7PA, SH21PA, SH28PA and SH30PA (all products of Toray-Dow Corning Silicone), and Troysol S366 (available from Troy Chemical).

Any type of nonionic surfactant may be used in the second aspect of the invention, insofar as the objects of the invention are attainable. Examples of suitable nonionic surfactants include polyoxyethylene alkyl ethers, polyoxyethylene aryl ethers, polyoxyethylene dialkyl esters, sorbitan fatty acid esters, fatty acid-modified polyoxyethylenes and polyoxyethylene-polyoxypropylene block copolymers.

Any type of fluorochemical surfactant may be used in the second aspect of the invention, insofar as the objects of the invention are attainable. Examples of suitable fluorochemical surfactants include perfluorooctyl polyethylene oxide, perfluorodecyl polyethylene oxide and perfluorododecyl polyethylene oxide.

Any type of acrylate surfactant may be used in the second aspect of the invention, insofar as the objects of the invention are attainable. Examples of suitable acrylate surfactants include (meth)acrylic acid copolymers.

Any type of silane coupling agent may be used in the second aspect of the invention, insofar as the objects of the invention are attainable. Illustrative examples include 3-glycidyloxypropyltrimethoxysilane, 3-aminoglycidyloxypropyltriethoxysilane, 3-methacryloxypropyltrimethoxysilane, 3-glycidyloxypropylmethyldimethoxysilane, 1-methacryloxypropylmethyldimethoxysilane, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane and N-bis(oxyethylene)-3-aminopropyltriethoxysilane. The silane coupling agent in the present invention may be used singly or as combinations of two or more thereof.

Any type of adhesive agent may be used in the second aspect of the invention, insofar as the objects of the invention are attainable. Illustrative examples include trimethoxysilyl benzoate, γ-methacryloxypropyltrimethoxysilane, vinyltriacetoxysilane, vinyltrimethoxysilane, γ-isocyanatopropyltriethoxysilane, γ-glycidoxypropyltrimethoxysilane, β-(3,4-epoxycyclohexyl)ethyltrimethoxysilane, trimethoxyvinylsilane, γ-aminopropyltriethoxysilane, aluminum monoethylacetoacetate diisopropylate, vinyltris(2-methoxyethoxy)silane, N-(2-aminoethyl)-3-aminopropylmethyldimethoxysilane, N-(2-aminoethyl)-3-aminopropyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, trimethylchlorosilane, dimethylvinylchlorosilane, methyldiphenylchlorosilane, chloromethyldimethylchlorosilane, trimethylmethoxysilane, dimethyldiethoxysilane, methyldimethoxysilane, dimethylvinylethoxysilane, diphenyldimethoxysilane, phenyltriethoxysilane, hexamethyldisilazane, N,N'-bis(trimethylsilyl) urea, dimethyltrimethylsilylamine, trimethylsilylimidazole, vinyltrichlorosilane, benzotriazole, benzimidazole, indazole, imidazole, 2-mercaptobenzimidazole, 2-mercaptobenzothiazole, 2-mercaptobenzoxazole, urazole, thiouracil, mercaptoimidazole, mercaptopyrimidine, 1,1-dimethylurea, 1,3-dimethylurea and thiourea compounds. A functional silane coupling agent is preferred as the adhesive agent. The amount of adhesive agent used is preferably not more than 10 parts by weight, and more preferably from 0.05 to 5 parts by weight, per 100 parts by weight of the total solids.

The film-forming composition may contain an organic solvent, thereby enabling the composition to be used as a coating solution. Illustrative examples of organic solvents that may be used include propylene glycol monomethyl ether acetate, propylene glycol monomethyl ether, 2-heptanone, cyclohexanone, γ-butyrolactone, ethylene glycol monomethyl ether, ethylene glycol monoethyl ether, ethylene glycol monoethyl ether acetate, propylene glycol monomethyl ether, propylene glycol monoethyl ether, ethylene carbonate, butyl acetate, methyl lactate, ethyl lactate, methyl methoxypropionate, ethyl ethoxypropionate, N-methylpyrrolidone, N,N-dimethylformamide, tetrahydrofuran, methyl isobutyl ketone, xylene, mesitylene and diisopropyl benzene. These may be used singly or in admixture.

The solids concentration of the film-forming composition in the second aspect of the invention may be suitably adjusted according to the intended use, but is preferably in a range of from 1 to 30 wt %. Within this range, the applied coat has a film thickness within a suitable range and the composition itself has a better storage stability. "Solids" refers here to the total solids which make up the film obtained by applying this film-forming composition to a substrate. Substances such as organic solvents which do not remain in the film following film formation are not included in the solids.

The method for preparing the film-forming composition containing a compound having a siloxane structure is not subject to any particular limitation. For example, use may be made of a method in which a polymer of a cage-type silsesquioxane compound of general formula (1), an organic solvent and, if necessary, the above-described optional ingredients are charged into a vessel and thoroughly mixed using a mixer or the like.

It is preferable to use the film-forming composition containing a compound having a siloxane structure for film formation after first removing insoluble and gel-like components by filtration with a filter. The filter used for this purpose has a pore size of preferably from 0.001 to 0.2 μm, more preferably from 0.005 to 0.05 μm, and most preferably from 0.005 to 0.03 μm. The filter material is preferably PTFE, polyethylene or nylon, and more preferably polyethylene or nylon.

To confer the insulating film according to the second aspect of the invention with good properties (dielectric constant, mechanical strength), it is preferable that the ratio of the total number of silicon atoms to the number of atoms of all elements in the total solids present in the film-forming composition be not more than 55%. "Total solids present in the film-forming composition" refers here to the total solids making up the film obtained by applying this composition to a substrate. Substances such as organic solvents and blowing agent which do not remain in the film following film formation are not included in the solids.

The above-described film-forming composition is applied to a substrate by any suitable method, such as spin coating, roller coating, dip coating, nozzle-scan coating, spraying or bar coating. Following application, the solvent may be removed by subjecting the applied composition to heating or drying treatment. The method for applying the composition to a substrate is preferably spin coating or nozzle-scan coating, and most preferably spin coating. A commercial apparatus may be used to carry out spin coating. For example, advantageous use may be made of any apparatus from the Clean Track series (manufactured by Tokyo Electron Ltd.), the D-Spin series (Dainippon Screen Mfg. Co., Ltd.), or the SS series or CS series (Tokyo Ohka Kogyo Co., Ltd.). Drying treatment is carried out under temperature conditions at which the film does not cure. As used herein, "curing" refers to curing which is achieved by heating and further polymerizing reactive radicals (e.g., carbon-carbon double bonds, carbon-carbon triple bonds) on the compound having a siloxane structure. Therefore, the temperature conditions during drying treatment refer to temperature conditions at which reactive radicals present in the film-forming composition (e.g., carbon-carbon double bonds, carbon-carbon triple bonds) are able to remain intact without substantially being consumed. Specifically, heating to remove the solvent by drying is preferably carried out at from 100 to 250° C. for a period of at least 1 minute but less than 5 minutes. Drying treatment may be carried out by dividing the operation into a plurality of steps performed under different conditions. The drying atmosphere is not subject to any particular limitation, and may be selected as appropriate. For example, drying may be carried out in air or in an inert gas (e.g., nitrogen, argon). From the standpoint of substrate transport, it is desirable to carry out treatment which ensures that no film remains on the edge of the substrate, such as edge bead removal and backside rinse.

The substrate used is not subject to any particular limitation. For example, a silicon wafer, $SiO_2$ wafer, SiN wafer, glass substrate, ceramic substrate or plastic substrate may be selected according to the intended use. A substrate having metal interconnects, such as a semiconductor integrated circuit having copper-containing interconnects, is preferred.

The total weight of the polymer of the cage-type silsesquioxane compound of general formula (1) accounts for preferably at least 70 wt %, more preferably at least 80 wt %, even more preferably at least 90 wt %, and most preferably at least 95 wt %, of the above-described applied film (coat). Also, the proportion of the vinyl and ethynyl groups on the cage-type silsesquioxane compound of general formula (1) which remain unreacted is preferably from 10 to 90 mol %, more preferably from 20 to 80 mol %, and most preferably from 30 to 70 mol %.

The coat has a film thickness which, while not subject to any particular limitation, is typically from 50 to 1,000 nm, preferably from 60 to 500 nm, and more preferably from 70 to 400 nm. A film thickness within this range is desirable from the standpoint of the low dielectric constant and the heat resistance of the film.

Microwave Irradiation

The insulating film according to the second aspect of the invention is formed by exposing a coat containing a compound having the above-described siloxane structure to microwaves having a frequency of 5.8 GHz. The microwave frequency used refers to a frequency of 5,800±75 MHz in the 5.8 GHz band, which is an ISM band.

A suitable and optimal microwave irradiation time is selected based on, for example, the compound having a siloxane structure.

The substrate temperature at the time of microwave irradiation is preferably from 250 to 450° C., more preferably from 250 to 400° C., and even more preferably from 250 to 350° C. To prevent the polymer of the invention from oxidizing, it is preferable to use an inert atmosphere of argon, helium, nitrogen or the like as the atmosphere near the substrate. The pressure at the time of microwave irradiation is preferably from 0 to 133 kPa.

Heat treatment may be carried out at the same time as microwave irradiation treatment or subsequent thereto. The heating method is not subject to any particular limitation, although use may be made of a commonly employed technique such as hotplate heating, a heating method that uses a furnace, or photoradiation heating by means of a xenon lamp, such as with a rapid thermal processor (RTP). Heat treatment is typically carried out at a temperature of preferably from 100 to 450° C., more preferably from 200 to 420° C., and even more preferably from 300 to 400° C., for a period of preferably from 1 to 30 minutes, more preferably from 1 to 15 minutes, and most preferably from 1 to 5 minutes. Heat treatment may be carried out in a plurality of divided steps.

More specifically, an insulating film having a low dielectric constant can be formed by using a spin coating technique to apply the film-forming composition to a substrate (typically a substrate having metal interconnects), removing the solvent by carrying out preheating treatment to effect drying, then subjecting the applied composition to microwave irradiation.

The relative dielectric constant of the insulating film obtained by the above-described method according to the second aspect of the invention varies depending on the material used, but is typically not more than 2.5, and preferably not more than 2.3, i.e., from 1.8 to 2.3, at a measurement temperature of 25° C.

The Young's modulus of the insulating film of the second aspect of the invention varies depending on the material used, but is preferably from 3.0 to 15.0 GPa, and more preferably from 5.0 to 15.0 GPa.

When the insulating film of the second aspect of the invention is used as an interlayer dielectric for semiconductor devices, the interconnect structure may have, at the interconnect sidewalls, a barrier layer for preventing metal migration; and may additionally have, at the top and bottom faces of the interconnects and the interlayer dielectric, capping layers and interlayer adhesion layers for preventing delamination during chemical mechanical polishing (CMP), as well as other layers such as etching stopper layers. Moreover, the interlayer dielectric may, if necessary, be divided into a plurality of layers composed of different materials.

The insulating layer of the second aspect of the invention may be formed into and used as a stacked structure together with other silicon-containing insulating films or organic films. Use as a stacked structure with hydrocarbon-based films is preferred.

The insulating film of the second aspect of the invention may be etched to form copper lines or for other purposes. Either wet etching or dry etching may be used, although dry etching is preferred. An ammonia plasma or a fluorocarbon plasma may be suitably used for dry etching. In this plasma, aside from argon, it is possible to use other gases such as oxygen, nitrogen, hydrogen or helium. Following the etching operation, ashing may be carried out to remove the photoresist, etc. used in etching. In addition, washing may be carried out to remove ashing residues.

Following copper line formation, the insulating film of the second aspect of the invention may be subjected to chemical mechanical polishing (CMP) to planarize the copper plated region. A commercial slurry (such as one produced by Fujimi Incorporated, Rodel-Nitta Company, JSR Corporation or Hitachi Chemical Co., Ltd.) may be suitably used as the CMP slurry. Commercially available equipment (such as equipment manufactured by Applied Materials or Ebara Corporation) may be used as the CMP tool. In addition, washing may be carried out to remove slurry residues following CMP.

In the second aspect of the invention, an insulating film having excellent film properties such as dielectric constant and mechanical strength can be obtained by irradiating the film containing a compound having a polysiloxane structure with microwaves having a frequency of 5.8 GHz. Although the detailed mechanism of the present invention is not well understood, a crosslinked structure is thought to form among the constituents of the composition as a result both of reactions involving reactive radicals such as carbon-carbon double bonds or carbon-carbon triple bonds remaining in the film composition and of hydrogen abstraction. Unlike conventional heat-setting treatment, the microwaves penetrate to the interior of the film, forming a crosslinked structure. In particular, because the frequency of 5.8 GHz is high, the energy level is also high, enabling treatment to proceed in a shorter period of time.

Improvements in heat resistance, mechanical properties and the like due to the cage structure are anticipated in polymers of the cage-type silsesquioxane compounds. Also, because the polymer has numerous radical polymerizable groups, the cured film has a higher crosslink density, which should enable even further improvement in performance to be achieved. Furthermore, because the cage-type structure results in sterically bulky groups, shrinkage on curing is limited and cracking associated with the generation of internal stresses is suppressed, which should enable adhesion with the substrate to be improved and film loss on curing to be minimized.

The films of the first and second aspects of the invention may be used for a variety of purposes, and are especially well-suited for use in electronic devices. "Electronic devices" refers herein to a broad range of electronic equipment, including semiconductor devices and magnetic recording heads. For example, the inventive films are highly suitable as insulating films in semiconductor devices such as LSIs, system LSIs, DRAMs, SDRAMs, RDRAMs and D-RDRAMs, and in electronic components such as multichip modules and multilayer wiring boards. In addition, the inventive films may be used in semiconductor devices as interlayer dielectrics, etching stopper films, surface protection films and buffer coating films, in LSIs as passivation films and films for blocking α radiation, in flexo printing plates as coverlay films and overcoat films, as cover coats for flexible copper-clad substrates, as solder resist films, and as liquid crystal alignment layers. The inventive films may also be used as surface protection films, anti-reflection coatings and phase shift films in optical devices. Of the above applications, the inventive films may be preferably used as interlayer dielectrics for semiconductors. Various other uses are also possible, such as filter membranes for water treatment, soil conditioner carriers, carriers for environmental remediation photocatalysts, and construction materials.

When the inventive films are used as interlayer dielectrics in semiconductor devices such as semiconductor integrated circuits, because film formation can be carried out in a very short time by microwave irradiation, the productivity is greatly improved. Generally, there is a concern that carrying out microwave irradiation on microfabricated products such as semiconductor devices will adversely affect the semiconductor device. However, such irradiation has been carried out deliberately in the present invention and found to have positive effects. Moreover, because there is no need for large-scale equipment such as heating units, the invention is desirable also from both an industrial and an economical standpoint.

EXAMPLES

First Aspect

The invention is illustrated more fully below by way of examples of the first aspect of the invention, although the first aspect of the invention is not limited by these examples.

The gel permeation column (GPC) measurements below were carried out using a Waters 2695 separation module and a Shodex GPC column (KF-805L). Measurement was carried out at a column temperature of 40° C., using tetrahydrofuran as the eluting solvent, and at a flow rate of 1 mL/min. The Mw and Mn were calculated using working curves prepared with a polystyrene standard.

Synthesis Example I-1

4,9-Diethynyldiamantane was synthesized by the method of described in *Macromolecules*, 5266 (1991). Next, 2 g of the 4,9-diethynyldiamantane, 0.22 g of dicumyl peroxide (Percumyl D, available from NOF Corporation) and 10 mL of t-butylbenzene were stirred for 7 hours under a stream of nitrogen gas at an internal temperature of 150° C. to effect polymerization. The reaction mixture was then cooled to room temperature, following which 60 mL of isopropyl alcohol was added. The solid that deposited out of solution was collected by filtration, then thoroughly rinsed with isopropyl alcohol, yielding 0.8 g of Polymer A having a weight-average molecular weight (Mw) of 15,000. Polymer A had a solubility in cyclohexanone of more than 15 wt % at 25° C. Coating solution A was prepared by completely dissolving 1.0 g of Polymer A in 10 g of cyclohexanone.

Synthesis Example I-2

Two grams of 4,9-diethynyldiamantane, 0.8 g of 1,1'-azobis(cyclohexane-1-carbonitrile)(V-40, available from Wako Pure Chemical Industries, Ltd.) and 10 mL of dichlorobenzene were stirred for 8 hours under a stream of nitrogen gas and at an internal temperature of 100° C. to effect polymerization. The reaction mixture was then cooled to room temperature, following which 100 mL of methanol was added. The solid that deposited out of solution was collected by filtration, then rinsed with methanol, yielding 1.0 g of Polymer B having a weight-average molecular weight (Mw) of 10,000. Polymer B had a solubility in cyclohexanone of more than 15 wt % at 25° C. Coating solution B was prepared by completely dissolving 1.0 g of Polymer B in 10 g of cyclohexanone.

Synthesis Example I-3

Aside from using 1,6-diethynyldiamantane prepared in general accordance with the synthesis method in the above-cited literature reference instead of 4,9-diethynyldiamantane, 0.9 g of Polymer C was synthesized by the same method as in Synthesis Example I-1. Based on GPC measurement, the weight-average molecular weight (Mw) was 20,000. Polymer C had a solubility in cyclohexanone of more than 15 wt % at 25° C. Polymer C was dissolved in cyclohexanone to prepare a 10 wt % Coating Solution C.

Synthesis Example I-4

Aside from using 1,3-diethynyladamantane prepared in general accordance with the synthesis method in the above-cited literature reference instead of 4,9-diethynyldiamantane, 0.7 g of Polymer D was synthesized by the same method as in Synthesis Example I-1. Based on GPC measurement, the weight-average molecular weight (Mw) was 20,000. Polymer D was dissolved in cyclohexanone to prepare a 10 wt % Coating solution D.

Coating solutions A to D were filtered with a 0.1-micron tetrafluoroethylene filter, then spin-coated onto silicon wafers. The resulting films were heated for 60 seconds at 200° C. on a hot plate under a stream of nitrogen so as to remove the solvent by drying, thereby giving uniform, even coats A to D having film thicknesses of 0.5 micron.

Coats A to D were then subjected to microwave irradiation (also referred to herein as "microwave curing") under the conditions shown in Table 1 below. Microwave curing was carried out with an AXOM 200/300 reactor manufactured by DSG Technologies. As comparative examples, each of the coats was heat-treated (also referred to herein as "heat curing") under the conditions shown in Table 1 below. Heat curing was carried out in a nitrogen atmosphere with a CLH-21CD (III) Clean Oven manufactured by Koyo Thermos.

TABLE 1

| Example | Coat | Curing method | Curing temperature | Curing time | Relative dielectric constant | Young's modulus |
|---|---|---|---|---|---|---|
| EX I-1 | Coat A | microwave curing | 300° C. | 30 sec | 2.42 | 7.2 GPa |
| EX I-2 | | microwave curing | 350° C. | 30 sec | 2.38 | 7.1 GPa |
| EX I-3 | | microwave curing | 375° C. | 30 sec | 2.38 | 8.8 GPa |
| EX I-4 | | microwave curing | 400° C. | 30 sec | 2.39 | 12.8 GPa |
| CE I-1 | | heat curing | 400° C. | 60 min | 2.42 | 8.0 GPa |
| CE I-2 | | heat curing | 300° C. | 60 min | 2.48 | 7.6 GPa |
| EX I-5 | Coat B | microwave curing | 300° C. | 30 sec | 2.43 | 7.4 GPa |
| EX I-6 | | microwave curing | 350° C. | 30 sec | 2.42 | 7.5 GPa |
| EX I-7 | | microwave curing | 375° C. | 30 sec | 2.42 | 7.9 GPa |
| EX I-8 | | microwave curing | 400° C. | 30 sec | 2.40 | 12.5 GPa |
| CE I-3 | | heat curing | 400° C. | 60 min | 2.43 | 7.8 GPa |
| CE I-4 | | heat curing | 300° C. | 60 min | 2.45 | 7.5 GPa |
| EX I-9 | Coat C | microwave curing | 300° C. | 30 sec | 2.37 | 7.5 GPa |
| EX I-10 | | microwave curing | 350° C. | 30 sec | 2.37 | 7.6 GPa |
| EX I-11 | | microwave curing | 375° C. | 30 sec | 2.37 | 7.7 GPa |
| EX I-12 | | microwave curing | 400° C. | 30 sec | 2.35 | 11.2 GPa |
| EX I-13 | | microwave curing | 300° C. | 60 sec | 2.33 | 7.5 GPa |
| EX I-14 | | microwave curing | 300° C. | 120 sec | 2.33 | 7.6 GPa |
| CE I-5 | | heat curing | 400° C. | 60 min | 2.37 | 7.5 GPa |
| CE I-6 | | heat curing | 300° C. | 60 min | 2.39 | 7.4 GPa |
| EX I-15 | Coat D | microwave curing | 300° C. | 30 sec | 2.55 | 2.8 GPa |
| EX I-16 | | microwave curing | 350° C. | 30 sec | 2.54 | 3.0 GPa |
| EX I-17 | | microwave curing | 375° C. | 30 sec | 2.50 | 4.5 GPa |
| EX I-18 | | microwave curing | 400° C. | 30 sec | 2.49 | 8.2 GPa |
| EX I-19 | | microwave curing | 300° C. | 60 sec | 2.54 | 3.2 GPa |
| EX I-20 | | microwave curing | 300° C. | 120 sec | 2.54 | 3.4 GPa |
| CE I-7 | | heat curing | 400° C. | 60 min | 2.55 | 3.0 GPa |
| CE I-8 | | heat curing | 300° C. | 60 min | 2.58 | 2.8 GPa |

Relative dielectric constant: The relative dielectric constant was calculated from the electric capacitance measured at 1 MHz using a mercury prober manufactured by Four Dimensions and an HP4285A LCR meter manufactured by Yokogawa-Hewlett Packard. The temperature during measurement was 25° C.
Young's modulus: Measured using a Nano Indenter SA2 manufactured by MTS.

As shown in the above table, for all of the applied coats, microwave curing—in spite of being carried out for a shorter treatment time and at a lower treatment temperature—resulted in the formation of films having lower relative dielectric constants and higher mechanical strengths than heat-cured films.

Second Aspect

The invention is illustrated more fully below by way of examples of the second aspect of the invention, although the second aspect of the invention is not limited by these examples.

The GPC measurements below were carried out using a Waters 2695 separation module and a Shodex GPC column (KF-805L). Measurement was carried out at a column temperature of 40° C., using tetrahydrofuran as the eluting solvent, and at a flow rate of 1 mL/min. The Mw, Mn and $M_{z+1}$ were calculated using working curves prepared with a polystyrene standard.

Example Compound (I)

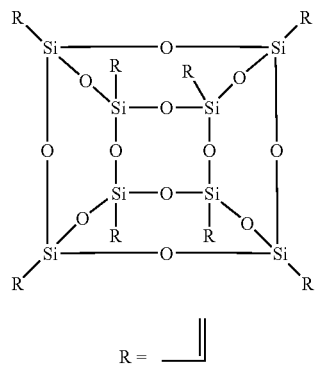

Synthesis Example II-1

One gram of above Example Compound I (available from Aldrich) was added to 80 g of butyl acetate. A solution composed of 5 mg of the polymerization initiator V-601 (available from Wako Pure Chemical Industries, Ltd.; 10-hour half-life temperature, 66° C.) diluted with 4 mL of butyl acetate was added dropwise over a period of 2 hours under a stream of nitrogen gas and heat refluxing (internal temperature, 127° C.). Following the completion of dropwise addition, heat refluxing was continued for one hour. 4-Methoxyphenol (20 mg) was then added as a polymerization inhibitor, following which the system was cooled to room temperature and concentrated in vacuo to a liquid weight of 2 g. Next, 20 mL of methanol was added and the system was stirred for 1 hour, following which the solids were collected by filtration and dried. The dried solids were then dissolved in 10 mL of tetrahydrofuran and 1.8 mL of water was added dropwise under stirring. After one hour of stirring, the supernatant was discarded by decantation, and 10 mL of methanol was added. The solids were collected by filtration and dried, yielding 0.49 g of solids. The solids were analyzed by GPC, whereupon the following results were obtained for components having a higher molecular weight than Example Compound I: Mw=158,000; $M_{z+1}$=310,000; Mn=89,000. The amount of unreacted Example Compound I in the solids was less than 3 wt %. The solids contained no components having a molecular weight above 3,000,000. On measuring the $^1$H-NMR spectra of the solids using heavy chloroform as the measurement solvent, a proton peak attributable to alkyl groups formed by polymerization of the vinyl groups and a proton peak attributable to residual vinyl groups were observed in an integrated ratio of 48:52, indicating that vinyl groups had polymerized with each other.

Next, 0.5 g of this composition was added to 5 mL of propylene glycol methyl ether acetate and uniformly dissolved by stirring at 40° C. for 3 hours. The resulting solution was passed through a Teflon® filter having a pore size of 0.2 µm, thereby giving Composition E of the present invention.

Based on the weight of the remaining monomer and the weight of the additives, the total number of silicon atoms accounted for less than 55% of the number of atoms of all elements present in the total solids within the composition.

Synthesis Example II-2

One gram of Example Compound I (Aldrich) was added to 26.4 g of butyl acetate. A solution composed of 1.8 mg of the polymerization initiator V-601 (available from Wako Pure Chemical Industries, Ltd.; 10-hour half-life temperature, 66° C.) diluted with 2 mL of butyl acetate was added dropwise over a period of 2 hours under a stream of nitrogen gas and heat refluxing (internal temperature, 127° C.). Following the completion of dropwise addition, heat refluxing was continued for one hour. 4-Methoxyphenol (20 mg) was then added as a polymerization inhibitor, following which the system was cooled to room temperature and concentrated in vacuo to a liquid weight of 2 g. Next, 20 mL of methanol was added and the system was stirred for 1 hour, following which the solids were collected by filtration and dried. The dried solids were then dissolved in 15 mL of tetrahydrofuran and 5 mL of water was added dropwise under stirring. After one hour of stirring, the supernatant was discarded by decantation, and 10 mL of methanol was added. The solids were collected by filtration and dried, yielding 0.60 g of solids. The solids were analyzed by GPC, whereupon the following results were obtained for components having a higher molecular weight than Example Compound I: $Mw=118,000$; $M_{z+1}=270,000$; $Mn=31,000$. The amount of unreacted Example Compound I in the solids was less than 3 wt %. The solids contained no components having a molecular weight above 3,000,000. Upon measuring the $^1$H-NMR spectra of the solids using heavy chloroform as the measurement solvent, a proton peak attributable to alkyl groups formed by polymerization of the vinyl groups and a proton peak attributable to residual vinyl groups were observed in an integrated ratio of 42:58, indicating that vinyl groups had polymerized with each other.

Next, 0.5 g of this composition was added to 5 mL of propylene glycol methyl ether acetate and uniformly dissolved by stirring at 40° C. for 3 hours. The resulting solution was passed through a Teflon® filter having a pore size of 0.2 µm, thereby giving Composition F of the present invention.

Based on the weight of the remaining monomer and the weight of the additives, the total number of silicon atoms accounted for less than 55% of the number of atoms of all elements present in the total solids within the composition.

Synthesis Example II-3

One gram of Example Compound I (Aldrich) was added to 13.2 g of butyl acetate. A solution composed of 1 mg of the polymerization initiator V-40 (available from Wako Pure Chemical Industries, Ltd.; 10-hour half-life temperature, 88° C.) diluted with 1 mL of butyl acetate was added dropwise over a period of 4 hours under a stream of nitrogen gas and while heat refluxing (internal temperature, 127° C.). Following the completion of dropwise addition, heat refluxing was continued for one hour. 4-Methoxyphenol (20 mg) was then added as a polymerization inhibitor, following which the system was cooled to room temperature and concentrated in vacuo to a liquid weight of 2 g. Next, 20 mL of methanol was added and the system was stirred for 1 hour, following which the solids were collected by filtration and dried. The dried solids were then dissolved in 10 mL of tetrahydrofuran and 1.8 mL of water was added dropwise under stirring. After one hour of stirring, the supernatant was discarded by decantation, and 10 mL of methanol was added. The solids were collected by filtration and dried, yielding 0.41 g of solids. The solids were analyzed by GPC, whereupon the following results were obtained for components having a higher molecular weight than Example Compound I: $Mw=128,000$; $M_{z+1}=380,000$; $Mn=33,000$. The amount of unreacted Example Compound I in the solids was less than 3 wt %. The solids contained no components having a molecular weight above 3,000,000. Upon measuring the $^1$H-NMR spectra of the solids using heavy chloroform as the measurement solvent, a proton peak attributable to alkyl groups formed by polymerization of the vinyl groups and a proton peak attributable to residual vinyl groups were observed in an integrated ratio of 53:47, indicating that vinyl groups had polymerized with each other.

Next, 0.5 g of this composition was added to 5 mL of propylene glycol methyl ether acetate and uniformly dissolved by stirring at 40° C. for 3 hours. The resulting solution was passed through a Teflon® filter having a pore size of 0.2 µm, thereby giving Composition G of the present invention.

Based on the weight of the remaining monomer and the weight of the additives, the total number of silicon atoms accounted for less than 55% of the number of atoms of all elements present in the total solids within the composition.

Compositions E to G prepared in the above synthesis examples were passed through a 0.1-micron tetrafluoroethylene filter, then applied by a spin coating process onto 4-inch silicon wafers, following which the substrates were pre-dried on a hot plate, first at 130° C. for 1 minute, then at 200° C. for 1 minute, thereby forming Coats E to G. Each of the coats had a film thickness of 450 nm.

Coats E to G were then subjected to microwave irradiation (also referred to herein as "microwave curing") under the conditions shown in Table 2 below. Microwave curing was carried out with an AXOM 200/300 reactor manufactured by DSG Technologies. As comparative examples, each of the coats was heat-treated (also referred to herein as "heat curing") under the conditions shown in Table 2 below. Heat curing was carried out in a nitrogen atmosphere with a CLH-21CD (III) Clean Oven manufactured by Koyo Thermos.

TABLE 2

| Example | Coat | Curing method | Curing temperature | Curing time | Relative dielectric constant | Young's modulus |
|---|---|---|---|---|---|---|
| EX II-1 | Coat E | microwave curing | 300° C. | 30 sec | 2.17 | 4.7 GPa |
| EX II-2 | | microwave curing | 350° C. | 30 sec | 2.15 | 5.6 GPa |
| EX II-3 | | microwave curing | 375° C. | 30 sec | 2.15 | 5.8 GPa |
| EX II-4 | | microwave curing | 400° C. | 30 sec | 2.10 | 8.4 GPa |

TABLE 2-continued

| Example | Coat | Curing method | Curing temperature | Curing time | Relative dielectric constant | Young's modulus |
|---|---|---|---|---|---|---|
| CE II-1 | | heat curing | 400° C. | 60 min | 2.17 | 4.6 GPa |
| CE II-2 | | heat curing | 300° C. | 60 min | 2.20 | 4.4 GPa |
| EX II-5 | Coat F | microwave curing | 300° C. | 30 sec | 2.28 | 4.3 GPa |
| EX II-6 | | microwave curing | 350° C. | 30 sec | 2.27 | 4.8 GPa |
| EX II-7 | | microwave curing | 375° C. | 30 sec | 2.26 | 6.5 GPa |
| EX II-8 | | microwave curing | 400° C. | 30 sec | 2.26 | 8.9 GPa |
| CE II-3 | | heat curing | 400° C. | 60 min | 2.28 | 4.3 GPa |
| CE II-4 | | heat curing | 300° C. | 60 min | 2.29 | 4.2 GPa |
| EX II-9 | Coat G | microwave curing | 300° C. | 30 sec | 2.27 | 6.2 GPa |
| EX II-10 | | microwave curing | 350° C. | 30 sec | 2.25 | 7.8 GPa |
| EX II-11 | | microwave curing | 375° C. | 30 sec | 2.24 | 8.2 GPa |
| EX II-12 | | microwave curing | 400° C. | 30 sec | 2.25 | 10.2 GPa |
| EX II-13 | | microwave curing | 300° C. | 60 sec | 2.25 | 6.5 GPa |
| EX II-14 | | microwave curing | 300° C. | 120 sec | 2.25 | 6.8 GPa |
| CE II-5 | | heat curing | 400° C. | 60 min | 2.27 | 6.2 GPa |
| CE II-6 | | heat curing | 300° C. | 60 min | 2.27 | 6.1 GPa |

Relative dielectric constant: The relative dielectric constant was calculated from the electric capacitance measured at 1 MHz using a mercury prober manufactured by Four Dimensions and an HP4285A LCR meter manufactured by Yokogawa-Hewlett Packard. The temperature during measurement was 25° C.
Young's modulus: Measured using a Nano Indenter SA2 manufactured by MTS.

As shown in the above table, for all of the applied coats, microwave curing—in spite of being carried out for a shorter treatment time and at a lower treatment temperature—resulted in the formation of films having lower relative dielectric constants and higher mechanical strengths than heat-cured films.

What is claimed is:

1. An insulating film which is formed by a process comprising the step of irradiating a film comprised of a silsesquioxane compound with microwaves having a frequency of 5.8 GHz.

2. The insulating film of claim 1, wherein the silsesquioxane compound is a cage-type silsesquioxane compound.

3. The insulating film of claim 2, wherein the cage-type silsesquioxane compound is a polymer of a cage-type silsesquioxane compound of general formula (1) below $$(R_1SiO_{3/2})_n \qquad (1),$$

wherein each occurrence of $R_1$ is independently a non-hydrolyzable group, with the proviso that at least two occurrences of $R_1$ are groups containing vinyl or ethynyl; and the letter n is an integer from 8 to 16.

4. An electronic device comprising the insulating film of claim 1.

* * * * *